United States Patent [19]

Hirukawa

[11] Patent Number: 5,267,286
[45] Date of Patent: Nov. 30, 1993

[54] FUEL ASSEMBLY AND REACTOR CORE

[75] Inventor: Koji Hirukawa, Yokohama, Japan

[73] Assignee: Kabushiki Kaisha Toshiba, Kawasaki, Japan

[21] Appl. No.: 910,846

[22] Filed: Jul. 6, 1992

[30] Foreign Application Priority Data

Jul. 5, 1991 [JP] Japan .................... 3-164782

[51] Int. Cl.⁵ .................................. G21C 1/04
[52] U.S. Cl. .......................... 376/353; 376/327; 376/370
[58] Field of Search ........... 376/353, 370, 210, 209, 376/398, 219, 327; 976/DIG. 123, DIG. 132, DIG. 133

[56] References Cited

U.S. PATENT DOCUMENTS 3,861,999  1/1975  Zmola et al. .................... 376/352

FOREIGN PATENT DOCUMENTS 63-73187  4/1988  Japan .
2-1590    1/1990  Japan .

Primary Examiner—Donald P. Walsh
Assistant Examiner—Meena Chelliah
Attorney, Agent, or Firm—Foley & Lardner

[57] ABSTRACT

A fuel assembly having a water cross or water rod arranged between the fuel rods, an inside of the water cross or water rod being divided into a coolant rising passage and a coolant lowering passage, and a control guide tube disposed inside the water cross or water rod and extending along an axial direction of the water cross or water rod. The coolant rising passage has a coolant inlet port formed to a portion above or under a portion at which the fuel rods are supported by the lower tie plate. The control element guide tube has a coolant outlet port formed at that portion so that a coolant introduced into the coolant rising passage flows vertically upwardly, then turns and flows downwardly along the control element guide tube, and flows into an inside thereof through the coolant outlet port. A reactor core comprises a plurality of fuel assemblies each having a structure described above, a control rod and a control element operated in association with the control rod.

23 Claims, 22 Drawing Sheets

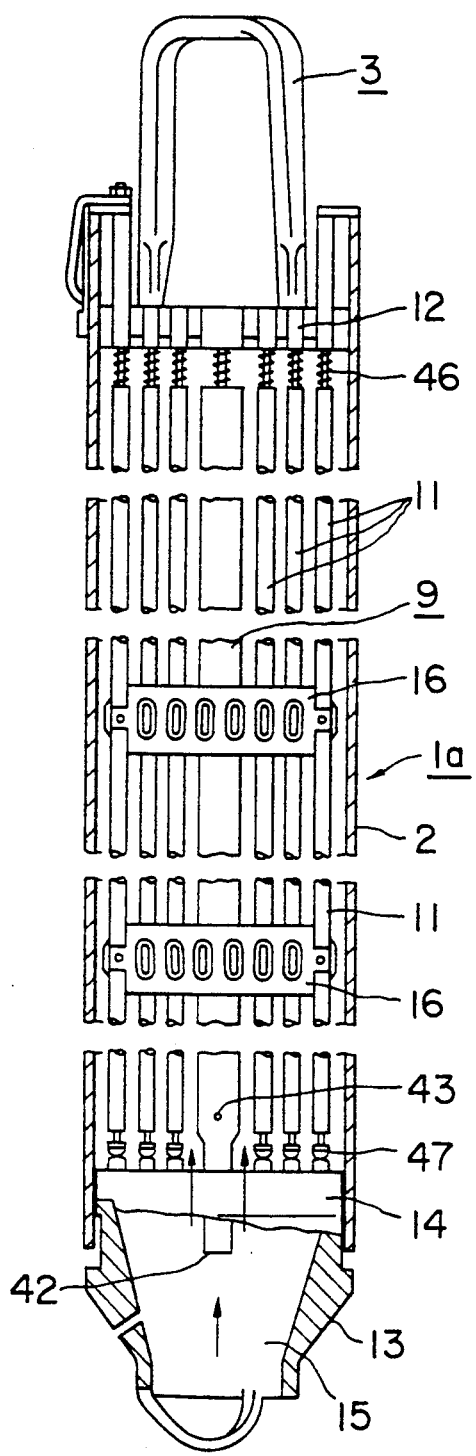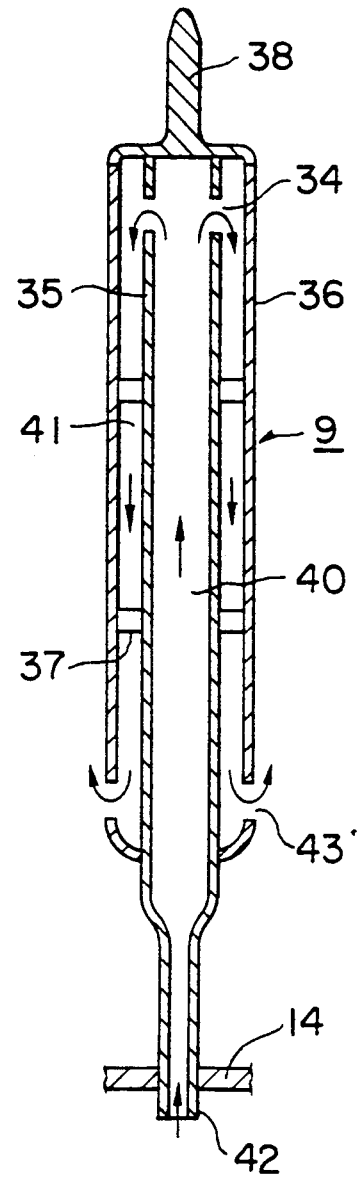
FIG. 24
PRIOR ART
FIG. 25
PRIOR ART

FUEL ASSEMBLY AND REACTOR CORE

BACKGROUND OF THE INVENTION

The present invention relates to a boiling water type reactor, and is more particularly concerned with a fuel assembly capable of carrying out a spectrum shift operation by controlling a flow resistance in a water cross or water rod arranged in the fuel assembly and also concerned with a reactor core equipped with the fuel assembly.

One conventional example of a fuel assembly which is charged in a reactor core of a boiling water type reactor (BWR) is shown in FIG. 21.

Referring to FIG. 21, a fuel assembly 1 is composed of a cylindrical, square in cross section, channel box 2 and a bundle of fuel rods 3. The fuel rod bundle 3 includes a plurality of fuel rods 11 arranged in square lattice form of 8 rows and 8 columns, for example, and a water rod 5 arranged at a central portion of the arrangement of the fuel rods 11. The water rod 5 has a diameter larger than that of the fuel rod 11. These fuel rods 11 and water rod 5 are supported together with a plurality of spacers disposed with spaces along the axial direction of the fuel assembly. An upper end plug 46 and a lower end plug 47 are mounted at the upper and lower end portions of these fuel rods 11 and the water rod 5, respectively. The upper end plug 46 is secured to an upper tie plate 12 provided with a handle 8 and the lower end plug 47 is also secured to a lower tie plate 13 provided with a coolant guide inlet 15.

A core water functioning as a moderator and a coolant flows into the fuel assembly as shown by arrows through the guide inlet 15 of the lower tie plate in a state that the core water rises upward through gaps between the respective fuel rods 11, and during the flowing, the core water removes a heat from the respective fuel rods 11 through heat exchanging function, thus the core water being finally formed at the upper portion of the core into steam and liquid flows.

The water rod 5 is provided with an opening 5a formed at the lower end thereof, and during this flow of the core water, the core water flows into the water rod 5 through this opening 5a, rises gently upward along the axial direction thereof and finally flows outward through a discharge port 5b into the upper portion of the fuel rods 11. The core water flowing in the water rod 5 mainly acts as the moderator and is mixed with the mixture of the steam and liquid flows at the upper portion of the core.

FIG. 22 shows an example in which a water cross 4 having a cruciform flow passage in cross section is arranged in place of the water rod 5 of FIG. 21. The water cross 4 has a coolant introducing port, not shown, at its lower end portion and has an upper end portion opened in cross shape. In FIG. 22, reference numeral 6 denotes a control rod. The structure of the control rod 6 is shown in FIG. 23, and referring to FIG. 23, the control rod 6 is composed of a sheath 117 in which a poison tube 118 is accommodated and which has an end secured to a central structural member 119. The sheath 117 also has an upper end to which is secured a handle 115 provided with a guide roller 116. To the lower end of the sheath 117 is secured a lower skirt 123, which is provided with a handle 120 for carrying out a separation from a control rod driving mechanism, not shown, a speed limiter 121 at the lower portion and a control rod driving mechanism socket 122.

The conventional BWR, as disclosed, for example, in the Japanese Patent Laid-open Publication No. 54-121389, has a core in which is arranged a fuel assembly provided with a water rod in which only the coolant flows for facilitating the moderation of neutrons. In the use of such water rod, reactivity of the core is made high as the number of the hydrogen atoms with respect to uranium atoms increases under the reactor running condition of the conventional BWR, thus enabling effective use of a nuclear fuel material charged in the core.

However, in order to further increase the effective use of the fuel material, it is better to change the number of the hydrogen atoms in the core in accordance with the burnup of the fuel material.

Advantages attained by changing the number of the hydrogen atoms in accordance with the burnup of the fuel material will be described hereunder.

FIG. 9 is a graph showing a relationship between burnup (axis of abscissa) and infinite multiplication factor (axis of ordinate) with respect to a typical example of the fuel assembly charged in the BWR. In FIG. 9, solid and broken lines both represent the same fuel assembly, but the broken line represents a case in which the burning is performed with constant void fraction (40%) in the coolant flow passage in the fuel assembly and, while, the solid line represents a case in which the reactor is operated initially with a high void fraction of 50% and with a reduced void fraction of 30% on the way of the operation. As can be understood from the graph of FIG. 9, more improved multiplication factor can be obtained at the final stage of the fuel life by burning initially with high void fraction and then reducing the same, and that is, a higher discharge exposure can be obtained.

This is because that the mean speed of the neutron becomes large and the neutron is easily absorbed by uranium 238 in the case of the high void fraction and the reduced number of the hydrogen atoms, i.e. small ratio of the number of the hydrogen atoms with respect to the number of the uranium atoms. A fuel material utilized for the BWR includes several % of uranium 235 and large % of uranium 238, thus almost uranium 238. In these uraniums, only the uranium 235 mainly absorbs the neutron and causesfission the uranium 238 hardly causes nuclear fission, and accordingly, as the uranium 235 reduces in its amount by the burning, the reactivity is lowered.

However, the uranium 238 is transformed to plutonium 239 by the absorption of the neutron having high energy caused by the fission. The plutonium 239 also causes fission by absorbing slowing-down thermal neutron like as the uranium 235. The higher the void fraction is, the higher the neutron energy is and, hence, the larger is the percentage for transforming the uranium 238 to the plutonium 239, whereby the fission of the uranium 235 and the plutonium 239 can be suppressed. Accordingly, the higher the void fraction is, the slower is the reduction of the whole quantity of the uranium 235 and the plutonium 239.

It is however noted that when the void fraction is high, the absolute value of the reactivity is low, and for this reason, when the high void fraction is kept as it is, the reactivity easily or speedily reaches its minimum level for keeping criticality in comparison with the low void fraction. Then, by lowering the void fraction at that time, the slowing-down effect of the neutron is increased and the fission of the uranium 235 and the plutonium 239 is thereby increased in comparison with the case of the constant void fraction, thus increasing the reactivity. Accordingly, the fissile material contained in the fuel material can be burned more longer till the reactivity reaches the minimum level necessary for the criticality.

The above described technical facts are the principle for achieving the effective use of the fuel material by changing the void fraction in accordance with the burning of the fissile material, which is hence called a spectrum shift operation.

One method of changing the number of the hydrogen atoms in the core in accordance with the burning of the fuel material for such spectrum shift operation has been proposed in the "Large Width Spectrum Shift BRW Core Concenpt (1)", No. F15 presentation on 1998, 4/4-4/6, by "SHO-63 Aunual Meeting" of Atomic Energy Society of Japan and in the Japanese Patent Laid-open Publication No. 63-73187. In these publications, as shown in FIGS. 24 and 25, a fuel rod support member 14 acting as resisting member is disposed at a lower portion of a fuel assembly 1a and a water rod 9 is provided with an inner tube 35 having a coolant inlet port 42 opened at an area below the resisting member 14 and having inside coolant rising passage 40. The water rod 9 also has a coolant lowering passage 41 and a coolant discharge opening 43 at an area above the resisting member 14 on that coolant lowering passage 41. The coolant lowering passage 41 is connected to the coolant rising passage 40 at the opening 34. The water rod 9 further includes an outer tube 36 supported to the inner tube 35 by means of spacers 37 and plugged with an end plug 38 at its upper end opening.

In the fuel assembly of the structure described above, as shown in FIG. 26, when the flow rate of the coolant passing the core decreases, the pressure difference between the inlet and outlet portions of the water rod 9 is reduced and steam is hence filled up in the flow passage of the water rod 9. On the contrary, when the flow rate increases, that pressure difference is increased and the steam in the passage of the water rod 9 is extremely reduced. Accordingly, it becomes possible to widely change the average void fraction in the fuel assembly and the increasing of the reactivity at the end of the reactor running cycle. Namely, during the initial half reactor running cycle in which the coolant flow rate is throttled, the moderator density is made large at the core lower portion in which a liquid phase exists in the flow passage of the water rod, and also the moderator density is made small at the core upper portion in which a steam phase exists therein. Therefore, during the initial half reactor running cycle, fuel material located in the core lower portion is mainly burned and the uranium 238 is transformed into the plutonium 239 in the core upper portion. On the other hand, during the later half reactor running cycle, the plutonium 239 transformed from the uranium 238 in the core upper portion during the initial half running cycle is mainly burned, whereby the fuel efficiency of the fuel material can be enhanced due to the spectral shift effect.

However, with reference to the conventional fuel assembly of the characters described above, in order to largely change the average void fraction in the fuel assembly, it is necessary to control the pressure difference between the inlet and outlet portions of the water rod in response to the core flow rate. By the way, in the BWR, the coolant flow rate depends on the output power and the axial power distribution of the fuel assembly. Accordingly, as the power of the fuel assembly becomes large, the void quantity is made large and the coolant flow rate of the fuel assembly is reduced by the increasing of two phase pressure drop. Further, in the case of the same output power of the fuel assembly, when the axial power distribution has downward peak, the void quantity is made large and the coolant flow rate is reduced by the increasing of the two phase pressure drop. The variation of the coolant flow rate due to the power distribution has a wide range of 20%. As shown in FIG. 26, the average void fraction of the water rod largely changes in response to the minute change of the pressure difference between the inlet and outlet portions of the water rod. Accordingly, for example, even if the water rod of the fuel assembly is surely controlled to about 10% of the low void fraction in a case where the reactor is operated with 110% of the rated core flow, and even if the water rod is surely controlled to about 70% of the high void fraction in a case where the reactor is operated with 70% of the core rated flow, with respect to an intermediate core flow rate between 110% and 70%, there causes large dispersion of the void fraction in the water rod depending on the power of the fuel such as 10% and 70%. As this result, there causes large difference between a signal of nuclear monitoring instrumentation in the core and an evaluation result based on three dimensional nuclear-thermal-hydraulic calculation program in which the power of the fuel assembly is monitored and simulated through an online, which results in a defect of being disadvantageous to the evaluation of thermal limitation with high performance in the core (MCPR, MLHGR). Furthermore, for the conventional water rod, it is necessary to widely change the core flow rate in order to carry out the spectral shift operation in which the void fraction in the water rod is widely changed, and in view of the limitation such as MCPR, there provides a defect such that the spectral shift cannot be performed in a case where the coolant flow rate cannot be throttled.

SUMMARY OF THE INVENTION

An object of the present invention, in view of the above facts, to substantially eliminate defects or disadvantages encountered in the prior art and to provide a fuel assembly or reactor core capable of carrying out the spectrum shift operation due to the void fraction change in the water rod or water cross freely with a high power near the rated power regardless of the core flow rate and the power distribution of the fuel assembly.

This and other objects can be achieved according to the present invention by providing, in one aspect, a fuel assembly comprising, in a vertically installed state:

an outer cylindrical channel box;
an upper tie plate;
a lower tie plate;
a number of fuel rods disposed inside the channel box so as to form coolant flow passage between mutually adjacent fuel rods and having upper and lower end portions supported by the upper and lower tie plates, respectively, each of the fuel rods being packed with a fuel pellet;
a water cross or water rod arranged between the fuel rods, an inside of the water cross or water rod being divided into a coolant rising passage and a coolant lowering passage; and a control element guide tube disposed inside the water cross or water rod and extending along an entire axial direction of the water cross or water rod, the coolant rising passage having a coolant inlet port formed to a portion above or under a portion at which the fuel rods are supported by the lower tie plate, the control element guide tube having a coolant outlet port formed at a portion near a portion at which the fuel rods are supported by the lower tie plate, so that a coolant introduced into the coolant rising passage flows vertically upwardly, then turns downwardly at a portion near an upper end of the water cross or the water rod and then flows downwardly in the coolant lowering passage along the outer surface of the control element guide tube in a direction reverse to the coolant flow in the coolant rising passage, and flows into an inside of guide tube thereof through the coolant outlet port, the control element guide tube having an upper opening opened outward at an upper end portion of the water cross or water rod and a lower end opening through which a control element is inserted into the control element guide tube, wherein the coolant outlet port formed to the control element guide tube is positioned in a vertical alignment between a lower end of active fuel length defined to the fuel rod and the lower opening end of the control element guide tube.

In another aspect, there is provided a reactor core comprising a plurality of fuel assemblies each having a structure described above, control rods having a cross shaped section to be inserted between the fuel assemblies and plural control elements to be combined with the control rod and inserted into the control element guide tube, wherein a average void fraction in the water rod or water cross is controlled by controlling an axial position of the control element inserted into the guide tube.

According to the fuel assembly or reactor core of the characters described above, when the coolant outlet port, i.e. drain port, formed to the control element guide tube at a portion near a portion at which the fuel rods are supported is opened, the coolant flow resistance at this port is small and the void fraction in the water cross or water rod becomes less than about 5%. While, when the coolant outlet port is partially closed by the shallow insertion of the control element, the coolant flow resistance is large and the void fraction becomes over about 80%, whereby the void fraction can be surely controlled. Furthermore, during the insertion operation of the control element to the fuel active portion of the fuel assembly for the controlling of the reactivity, even if the pressure in the control element guide tube may be increased, water or steam is escaped through an upper open end having a small coolant flow resistance, so that the insertion of the control rod can be made smooth.

Further features and characters of the present invention will be made more clear hereunder by way of preferred embodiments with reference to the accompanying drawings.

BRIEF DESCRIPTION OF THE DRAWINGS

In the accompanying drawings:

FIG. 24 is an elevational section of a fuel assembly of a conventional structure having a water rod for a spectral shift operation;

FIG. 25 is a detailed view of a water rod shown in FIG. 24; and

DESCRIPTION OF THE PREFERRED EMBODIMENTS

Figure 1:
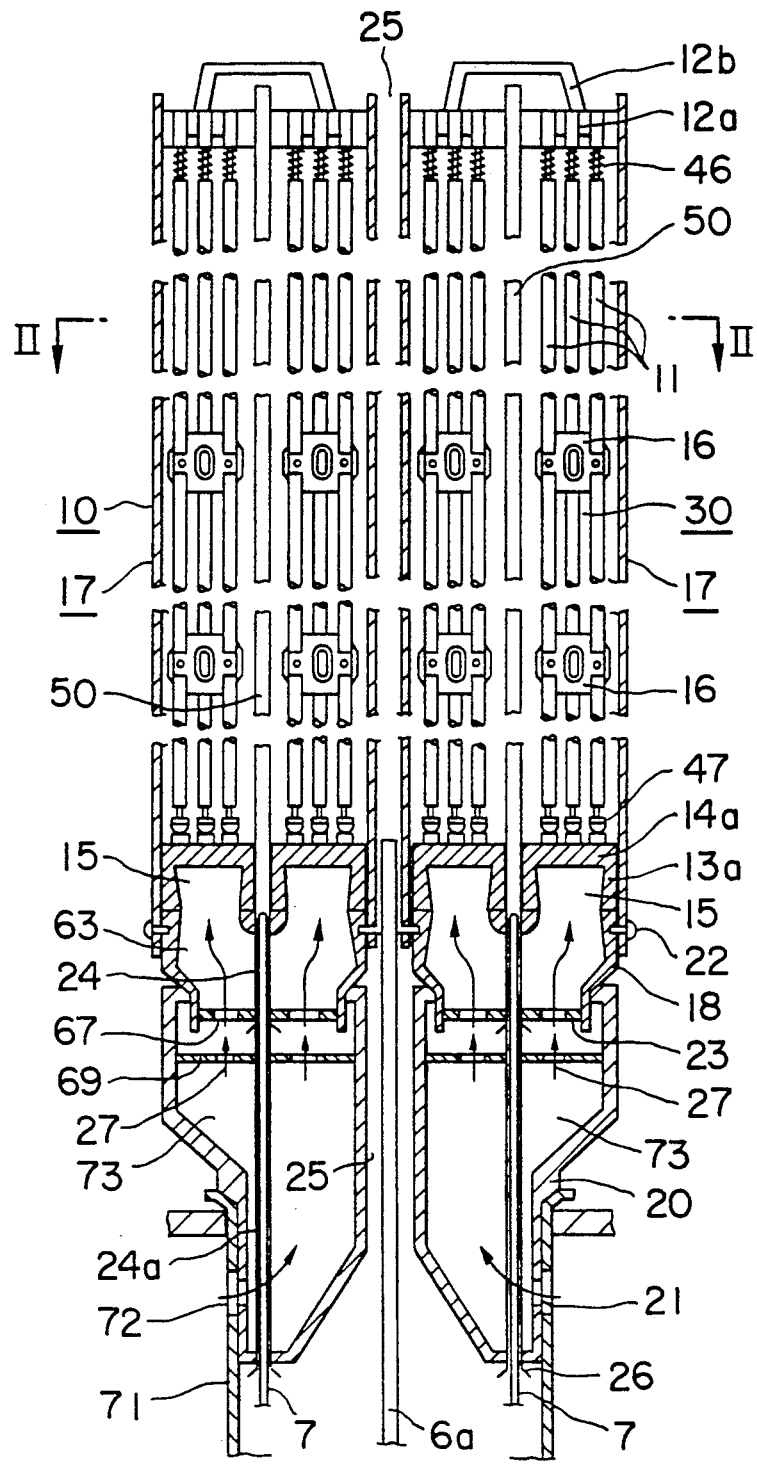
FIG. 1 is an elevational section of a fuel assembly according to a first embodiment of the present invention.

One embodiment according to the present invention will be described hereunder with reference to FIGS. 1 to 7.

In this embodiment, a fuel assembly 10 is composed of four small fuel bundles 30, fuel assembly upper portion tie members 12b, channel boxes 17, a water cross 50 and fuel assembly lower nozzles 18. The water cross 50 is integrally welded to the channel box 17 to divide the inside of the channel box 17 into four coolant flow passages.

The four small fuel bundles 30 are respectively provided with upper tie plates 12a and lower tie plates 13a and arranged in flow passages surrounded by the central water cross 50 and the channel boxes 17 with the lower tie plates 13a being mounted on the fuel assembly lower nozzles 18. The upper and lower end portions of the fuel rods 11 are supported by the upper and lower tie plates 12a and 13a. A plurality of spacers 16 are arranged along the axial direction of the fuel bundles 30 to properly keep the gaps between the mutually adjoining fuel rods 11. The fuel spacers 16 are supported in their axial directions by fuel rods provided with tabs, not shown. The channel boxes 17 are fastened to the fuel assembly lower nozzles 18 with fastening screws 22 to thereby surround the outer peripheries of the four fuel bundles 30, respectively, thus constituting one fuel assembly unit.

Figure 7:
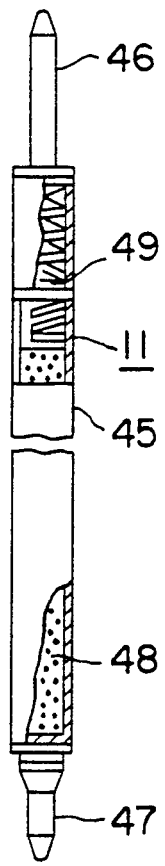
FIG. 7 shows, partially in section, of a fuel rod of FIG. 1.

The lower tie plate 13a mounted on the lower nozzle 18 has, at its upper end, a fuel rod support 14a which is provided with, a coolant inlet from space 15. As shown in FIG. 7, each of the fuel rod 11 is composed of a cladding tube 45 into which a plurality of fuel pellets 48 are charged and upper and lower ends of the cladding tube 45 are plugged with plugs 46 and 47. A gas plenum 49 is formed to the inner upper portion of the cladding tube 45.

Figure 3:
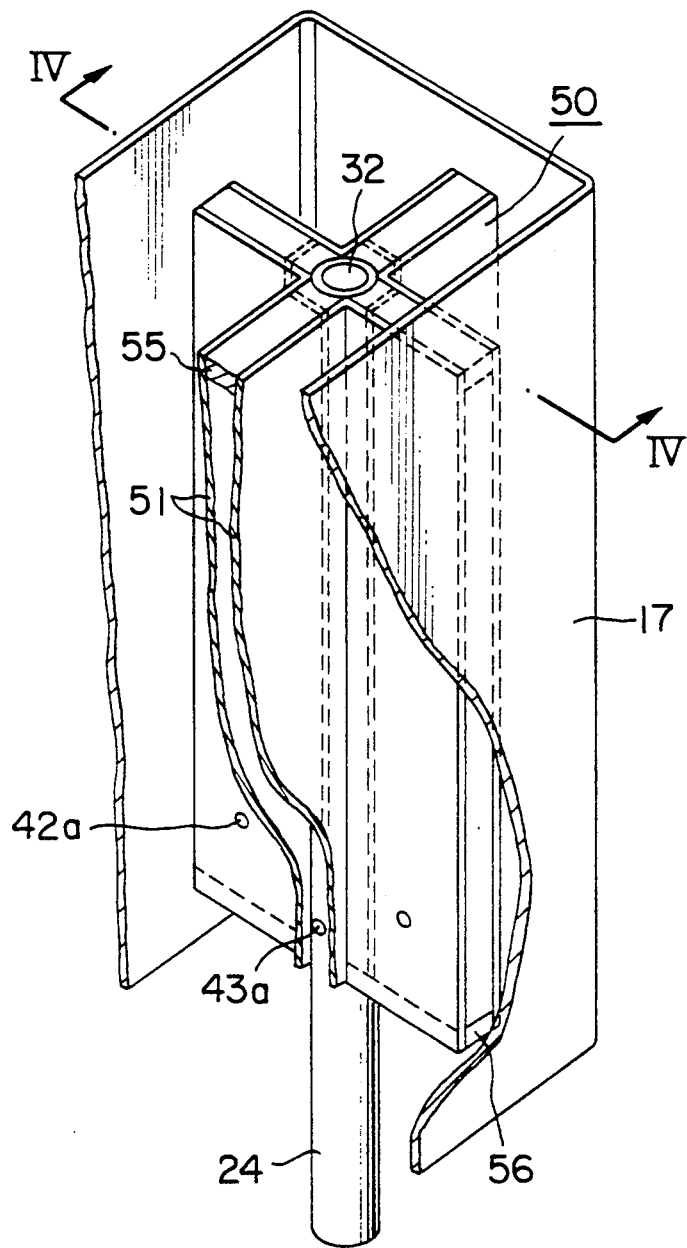
FIG. 3 is an illustrated perspective view in which a channel box and a water cross of FIG. 1 are partially broken away.
Figure 4:
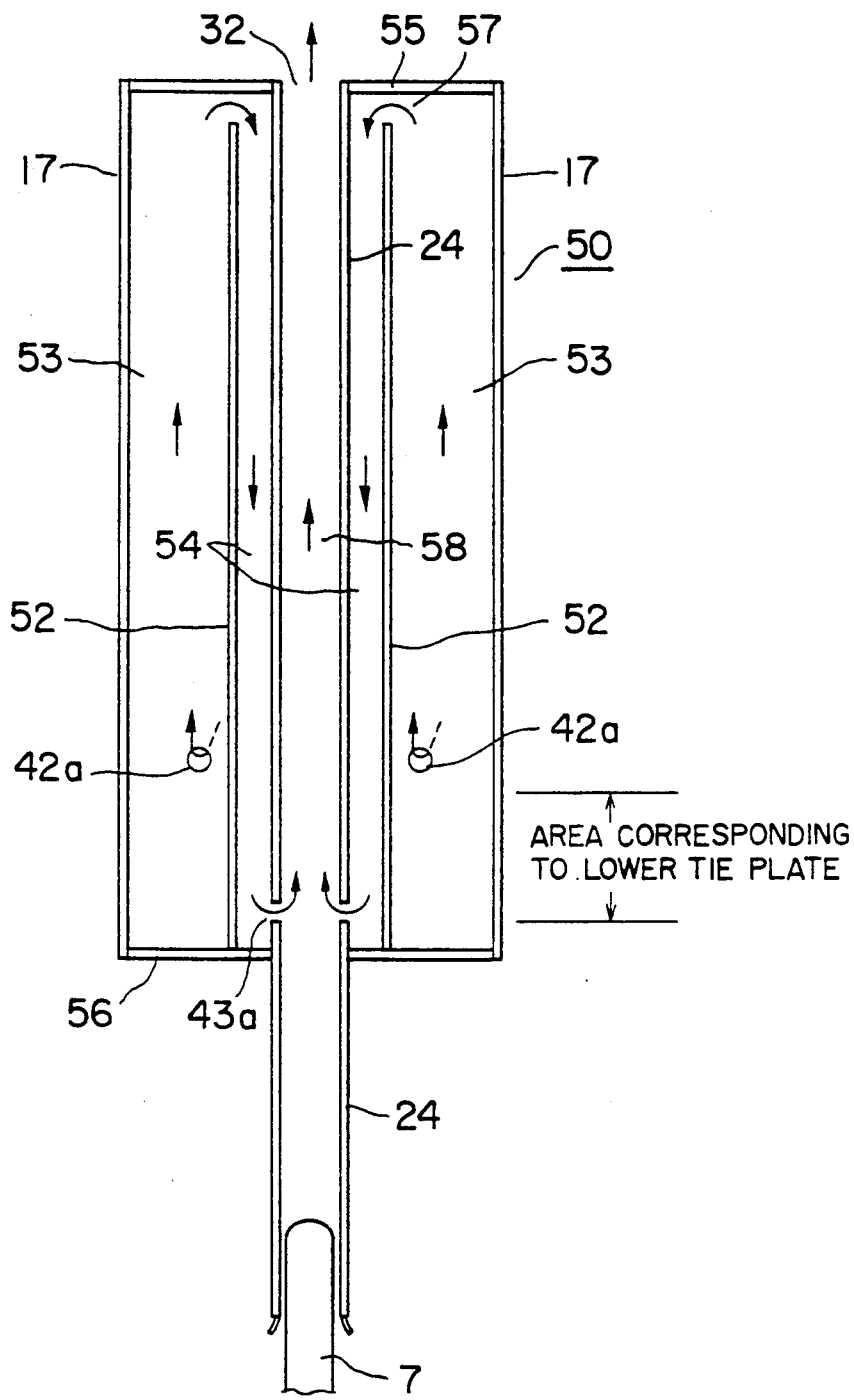
FIG. 4 is an elevational section taken along the line IV—IV in FIG. 3.

FIGS. 3 and 4 represent detailed structure of the water cross 50 providing one feature of the present invention. Referring to FIGS. 3 and 4, the water cross 50 is constituted by four plate members 51 each in substantially L-shape, the channel box 17 and, coolant rising and lowering passages 53 and 54 both surrounded by the L-shaped plate members 51 and the channel box 17.

FIG. 4 is an illustration of sectional view taken along the line IV—IV of FIG. 3, and referring to FIG. 4, the upper and lower end portions of the cross water 50 are closed by upper and lower cover members 55 and 56, and partition plates acting as flow passage sectioning spacers 52 are arranged to keep gaps between the L-shaped plate members 51 to thereby form the coolant rising and lowering passages 53 and 54. A guide tube 24 for guiding a control element is fitted in the central portion of the water cross 50 and supported by the L-shaped plate members 51. The guide tube 24 penetrates the upper cover member 55 at its upper end. The upper end of the guide tube 24 is opened upward. The lower end of the guide tube 24 penetrates the lower cover member 56 and extends downward into a through hole 62, shown in FIG. 5E, of a fuel assembly lower nozzle 18.

The flow passage sectioning spacers 52 are disposed at blade (or wing) portions of the water cross 50 and divides the flow passage of this blade portions into the coolant rising passages 53 and the coolant lowering passages 54. In the illustrated structure, the flow passage adjoining the control element guide tube 24 is referred to as the coolant lowering passage 54. The flow passage sectioning spacer 52 has a conjunction port 57 positioned below the upper cover member 55 to connect the coolant rising passage 53 with the coolant lowering passage 54. The sectioning spacer 52 extends towards the lower cover member 56 to divide the coolant passages. The lower portions of the blade portions of the water cross 50 are closed by the lower cover member 56 positioned below the fuel rod support portion 14a of the lower tie plate 13a. The coolant rising passage 53 has a coolant inlet 42a positioned above the fuel rod support portion 14a. The coolant lowering passage has a drain port 43a towards the control element guide tube at a portion near the lower end thereof.

The details of the lower nozzle or nozzles 18 and its associated members are described hereunder with reference to FIGS. 5A to 5D.

Figure 5A:
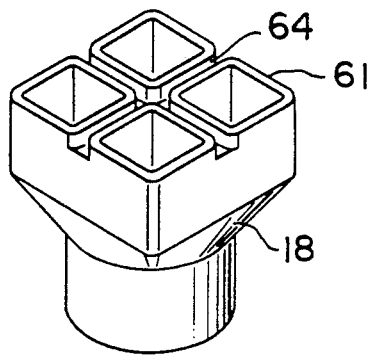
FIGS. 5A to 5E are views showing structure, in various directions, of a lower nozzle of the fuel assembly of FIG. 1.

A fuel assembly weight is applied to the upper portion of the fuel assembly lower nozzle 18 because the lower tie plate 13a of the fuel bundle 30 is mounted on the fuel support seat 61. The lower end of the water cross 50 is inserted into grooves 64 formed to the fuel support seat 61 to thereby separate the coolant flow passages of the fuel bundle 30 so as not to be connected between them. Namely, as shown in FIG. 5A, the grooves 64 are also have a cross shape as a whole. A control element guide tube support tube 68 is arranged at the central portion of the grooves 64 to form a through hole 62 to be inserted by the control element guide tube 24.

Extended portions 65 constituting the grooves 64 extend to the lower portion of the lower nozzle 18 to thereby divide into sections four lower nozzle flow passages 63. Orifice plates 23 are disposed at the lower portions of the lower nozzle flow passages 63, respectively, to form orifices 67.

The lower end portion of the control element guide tube 24 is connected to the control element guide tube 24a secured to a fuel support fitting 20. The fuel support 20 is fitted into an upper opening of the control rod guide tube 71 and is provided with an opening 25 at its central portion so as to act as a guide for the insertion of the cruciform control rod blade into the water gap between the fuel assemblies 10 as shown in FIG. 1. Surrounding the cross shaped through hole 25, there are arranged four openings 73 for receiving the fuel assembly lower nozzles 18, respectively, to form a coolant flow passage of the fuel support 20. One such coolant flow passage is formed to one fuel assembly surrounding the cruciform control rod blade. In the central portion of the opening 73, the control element guide tube 24a is disposed. The guide tube 24a is connected to the control element guide tube 24, penetrating the fuel support 20, having a control element insertion hole 26 at the bottom of the support 20 and then supported by a support plate 69. The support plate 69 has an opening 27 through which the coolant passes. The fuel support 20 is provided with a lower side surface to which orifices 21 for the coolant flow passage conjunction with the openings 73 are formed at a portion facing the openings 72 of the control rod guide tube 71.

Figure 6A:
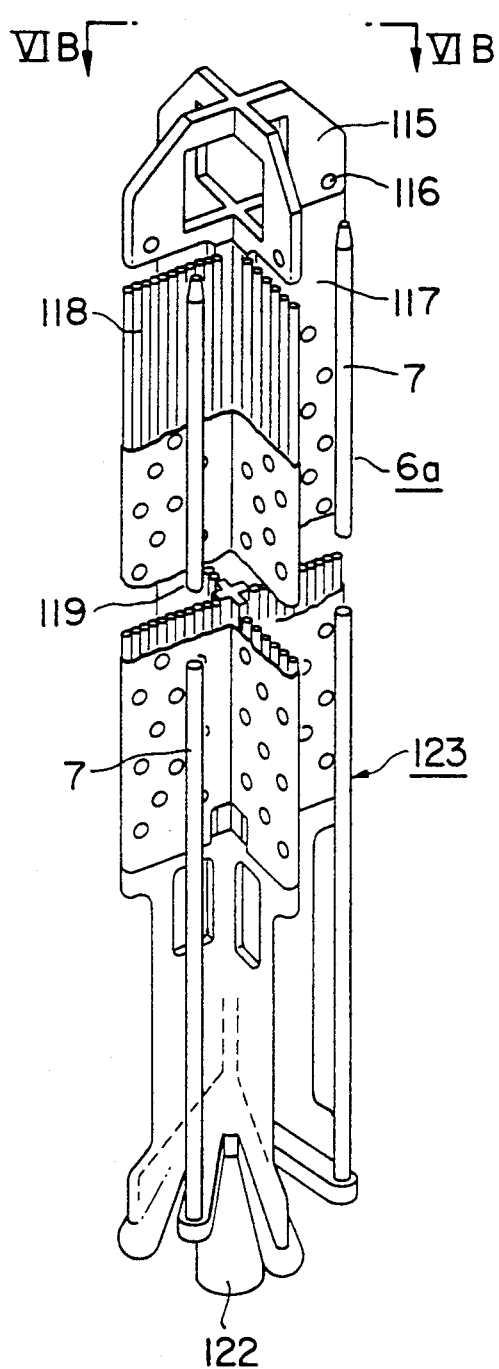
FIG. 6A is a perspective view showing an entire cross shaped control rod having control elements.
Figure 6B:
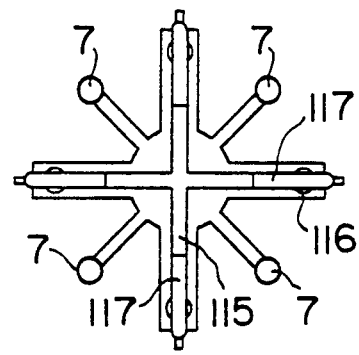
FIG. 6B is an end view from an arrowed direction VIB-VIB in FIG. 6A.

FIG. 6 shows an appearance of the control rod 6 utilized in combination with the fuel assembly according to the present invention.

Figure 23:
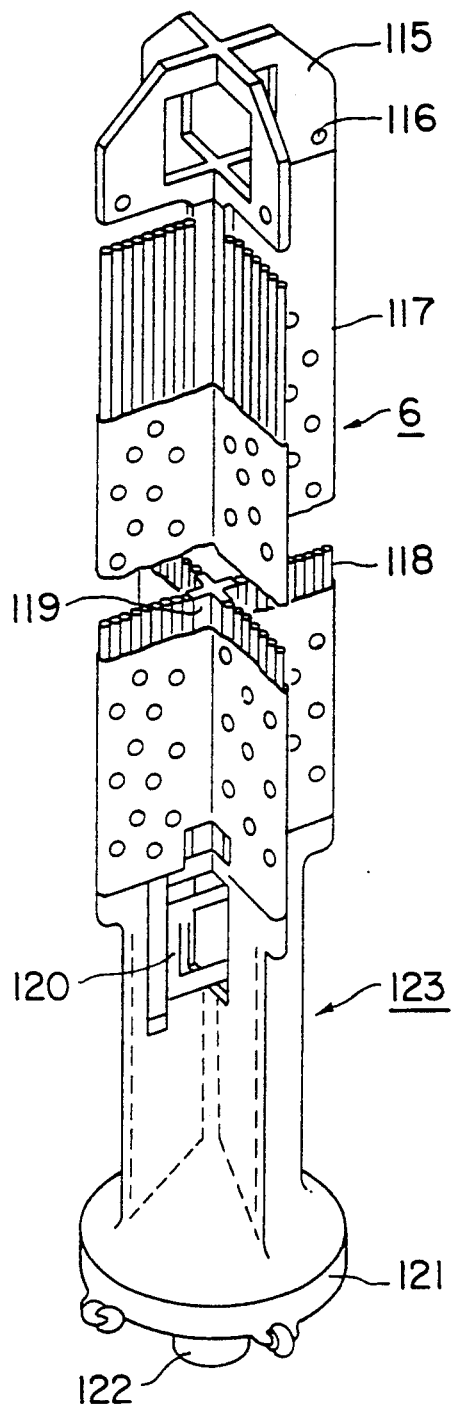
FIG. 23 is a perspective view of a cross shaped control rod of a conventional structure.
Figure 26:
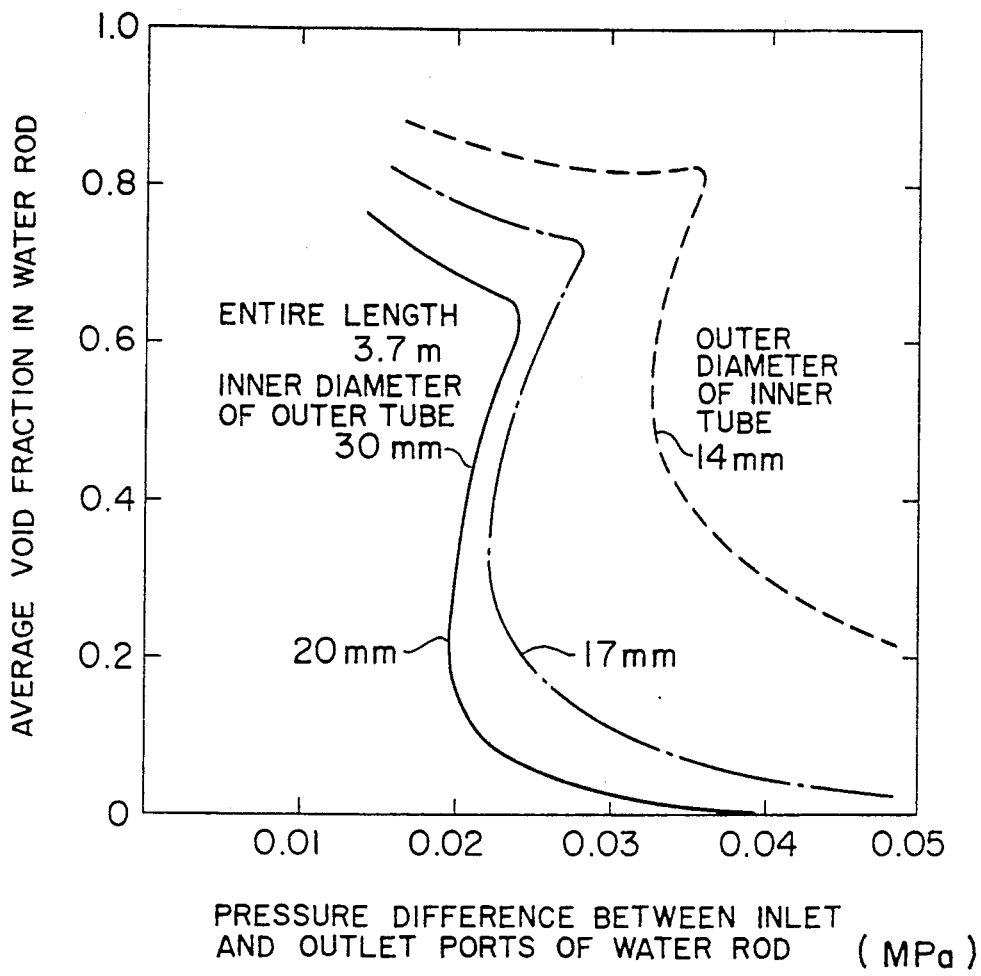
FIG. 26 is a graph representing a relationship between a void fraction and a pressure difference between coolant inlet and outlet ports of the water rod of FIG. 24.

The control rod 6 corresponds to that shown in FIG. 23 but additionally provided with columnar control elements 7 and mainly composed of sheaths 117 control rod blade provided inside with poison tubes 118 and the control elements 7. The control element 7 may be composed of a hollow tube made of SUS into which neutron absorbing poison such as B$_4$C, Hf is packed, or composed of mere a hollow tube or SUS rod. Further, in the illustrated example, a speed limiter and a control rod connection-separation handle of conventional structure are not located.

The operation and function of the fuel assembly of the present embodiment will be described hereunder by assuming that the fuel assembly is charged in the core of the BWR.

As shown in FIG. 1, the coolant is guided into the coolant flow passage between the fuel rods 11 of the fuel bundle 30 through the opening 72 of the control rod guide tube 71, the coolant passing orifice 21 of the fuel support 20, the opening 67 of the lower nozzle 18 of the fuel assembly, and the through hole formed to the fuel rod support member 14a of the lower tie plate 13a. One part of the coolant flown in the coolant guide port 15 of the lower tie plate 13a flows towards a bypass flow passage, which is outside a channel flow passage, through a leak hole formed to the lower nozzle 18. One part of the coolant flown in the upper portion of the fuel rod support member 14a is flown, as shown in FIGS. 3 and 4, into the coolant rising passage 53 through the coolant inlet 42a of the water cross 50, and then drained inside the control element guide tube 24 through the conjunction port 57, a flow lowering passage 54 and the drain port 43a at a portion near the lower end of the flow passage of the water cross.

Figure 8:
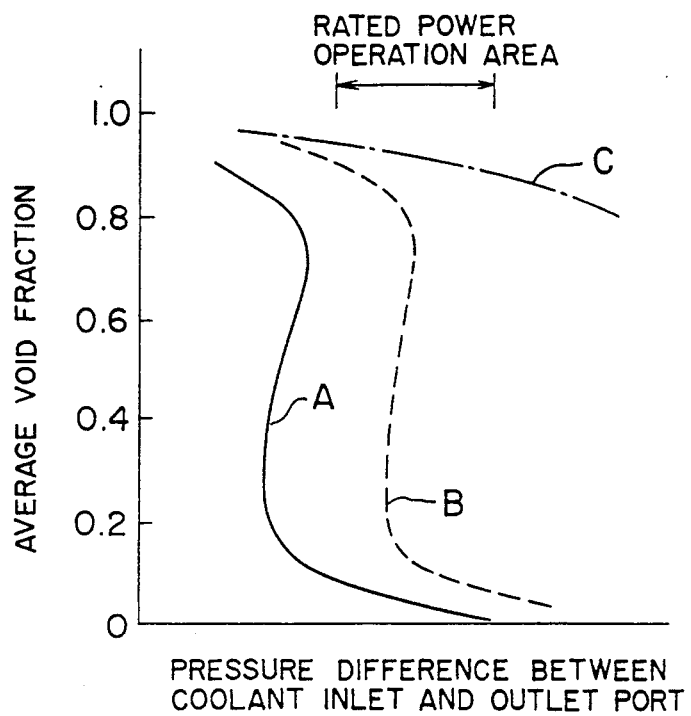
FIG. 8 is a graph representing a relationship between the void fraction and pressure difference between coolant inlet and outlet ports in a water rod or water cross.
Figure 9:
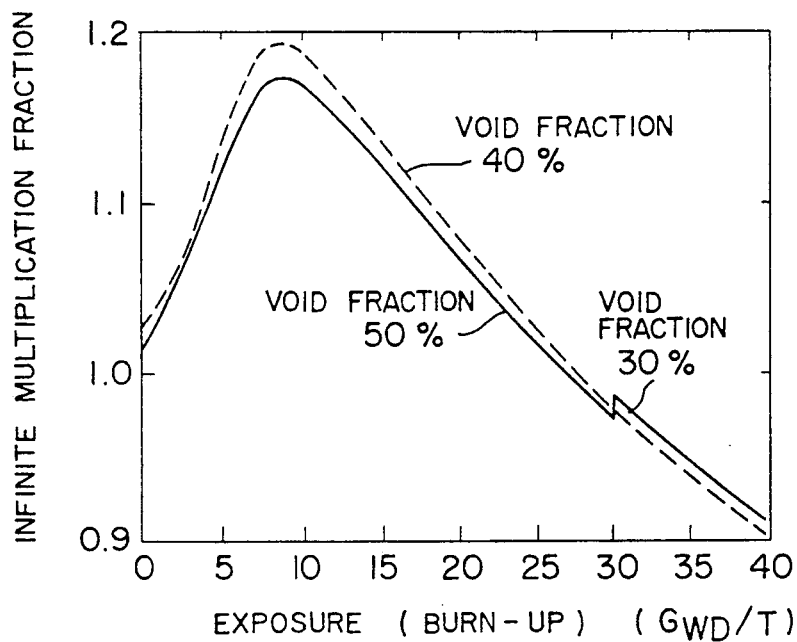
FIG. 9 is a graph showing a characteristic of the change of infinite neutron multiplication factor with respect to exposure in a case where a spectral shift operation is carried out or not carried out.

In a case where the front (upper) end of the control element 7 is positioned below the drain port 43a, the coolant flown through the coolant drain port 43a becomes the liquid phase and/or steam phase in accordance with the flow rate of the coolant flown through the coolant inlet port 42a in response to the core flow rate (refer to curve A in FIG. 8). In the present embodiment, the coolant inlet port 42a is disposed slightly above the fuel rod support member 14a for the reason that the pressure in the control element guide tube 24 is equal to that in the bypass flow passage, and accordingly, the coolant inlet port 42a is disposed above the fuel rod support member 14a for preventing the coolant from excessively flowing. This further has advantage for easily designing the openings diameter of 42a and 43a. So, depending on desighs, the coolant inlet port 42a is disposed under the fuel rod support member 14a.

In a case where the front end of the control element 7 is positioned above the drain port 43a, there causes a large flow resistance because the drain port 43a is closed by the control element 7. A steam void is caused in the inside of the water cross 50 by the heating and heat transfer due to neutron and γ-rays, which results in the increasing of the pressure drop at portions of the drain port 43a, the coolant rising passage 53 and the coolant lowering passage 54. Accordingly, the water levels of the coolant rising and lowering passages 53 and 54 fall until the time when the pressure difference between the coolant inlet 42a and the drain port 43a is balanced to the water head and pressure drop in the water cross 50, thus the steam being filled up in the water cross 50. Furthermore, since the coolant is less supplied in the control element guide tube 24, the steam void is also caused and the inside of the water cross is hence almost filled up with the steam (refer to the curve C in FIG. 8).

In a case where the control rod 6a is inserted into the upper portion, the control element 7 is also inserted into the upper portion of the control element guide tube arranged centrally in the water cross 50. In this case, the upper end of the flow passage 58 is opened, and hence, the coolant is discharged through the upper end opening without increasing its pressure. According to such structure, the control rod can be easily inserted, thus preventing the fuel assembly from jumping at the control rod insertion operation.

In a case where the control rod is withdrawn downward, the pressure in the control element guide tube is reduced, but since the steam occupies the inside of the control rod guide tube during power operation state and its steam is expanded, the degree of such pressure reduction is small. In the shut-down state, since non-boiling water occupies the inside of the control element guide tube, the flow resistance becomes small and the non-boiling water is counterflown through the upper end opening, thus easily withdrawing the control rod.

The function of the fuel assembly 10 of the present invention charged in the BWR will be described hereunder.

An example is taken to a case where 100% rated power is kept between the core flow rate of 80 to 115%. The core flow rate is kept to 80% during the almost period (about 70 to 80%) of the operating cycle, thereby compensating against the reactivity change due to the burning of the fuel by adjusting the reactivity by means of the control rod. In the fuel assembly with the control rod being drawn out, the axial direction of the control rod is set so as to position the upper end of the control element 7 to a position above the coolant drain port 43a of the water cross 50 and below the fuel active region of the fuel assembly. The number of the fuel assemblies, in which the upper ends of the control elements 7 are set to portions below the drain port 43a by further drawing downward the control rods from the time when the rated power cannot be kept even by entirely drawing out the all control rods from the core fuel active regions, is increased in response to the reduction of the reactivity. Furthermore, the core flow rate is finally increased so as to obtain the core maximum flow rate of 115% at the end of the operating cycle, whereby the core reactivity at the end of the cycle is increased and the cycle life can thus be expanded.

When the pressure difference (between the inlet and outlet ports of the water cross of the present invention)—the void factor characteristic is set to the curve A in FIG. 8 with respect to a case where the upper end of the control element 7 is positioned below the drain port 43a, the inside of the water cross is kept with the void factor less than 10% in a core flow rate range (in this example, 80 to 115% rated core flow rate) utilized in the rated power operation period. Accordingly, there causes no dispersion of the void fraction inside the water rod between the fuel assembly due to the power distribution (curve B in FIG. 8) caused by the water rod of the conventional design of the fuel assembly. Further, in a case where the upper end of the control element 7 is positioned above the drain port 43a, the void fraction inside the water cross is kept more than 80%, as shown by the curve C in FIG. 8, in the core flow rate range operated with the rated power. Accordingly, at the power operation period, for the control rods except for those inserted into the fuel active region of the fuel assemblies for controlling the excessive reactivity and the core power distribution, the void fraction inside the water cross can be kept more than 80% by setting the control rods at axial portions at which the upper ends of the control elements 7 are positioned just above the drain ports 43a and below the fuel active region in the core flow rate range which is utilized at the rated power without lowering the power at the lower portions of the fuel assemblies. As this result, according to the present invention, the steam void can be caused inside the water cross 50 by the axial position control of the control rod without being influenced with the core flow rate, and the power level and the axial power distribution of the fuel assembly throughout the almost operation period of cycle with the core flow rate being less than 100%, whereby the production of the plutonium 239 can be facilitated under the suppression of the neutron moderating.

Furthermore, in a case where the core flow rate is largely reduced at the reactor starting period or shutdown operation period, for example, at the time of less than 65% rated core flow rate, the void fraction inside the water cross can be kept high regardless of the position of the control rods, so that the inclination of the curve, representing the reactor core flow rate—power curve, become large and the core power control can be hence easily done, which is the same merit as that in the conventional design of the fuel assembly with the water rod 9.

Still furthermore, since the void fraction in the water cross can be precisely controlled by the control rods, the evaluation accuracy of the thermal limitation, the power distribution, the exposure distribution and the reactivity can be remarkably improved, with the three dimensional nuclear-thermal-hydraulic simulation code, as well as the improvement in the monitoring of the core performance. In addition, since the control elements can be inserted into the inside of the central control element guide tube of the water cross of the fuel assembly, the core shut-down margin can be increased in comparison with the fuel assembly of the conventional structure.

Other embodiments according to the present invention will be described hereunder with reference to FIGS. 10 to 20.

Figure 10:
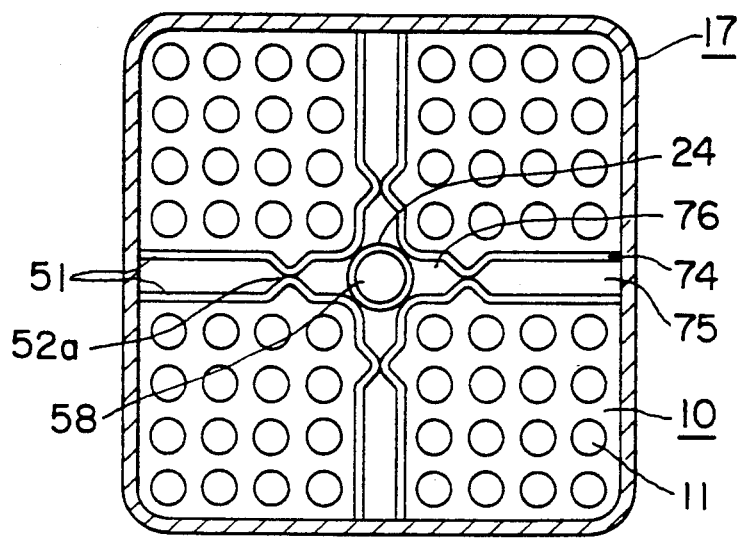
FIG. 10 shows a cross section similar to that of FIG. 2 but representing a second embodiment of the present invention.

First, referring to FIG. 10 representing a second embodiment of the fuel assembly according to the present invention, the L-shaped plate members 51 constituting the water cross are press bent and welded to form coolant flow sections. In the first embodiment, the flow passage sectioning spacers of the water cross are utilized for forming the coolant rising passage and the coolant lowering passage. According to the structure of this second embodiment, the spacers 52 of the first embodiment can be eliminated for forming the coolant rising and lowering passages 75 and 76, thus simplifying the structure.

Figure 11:
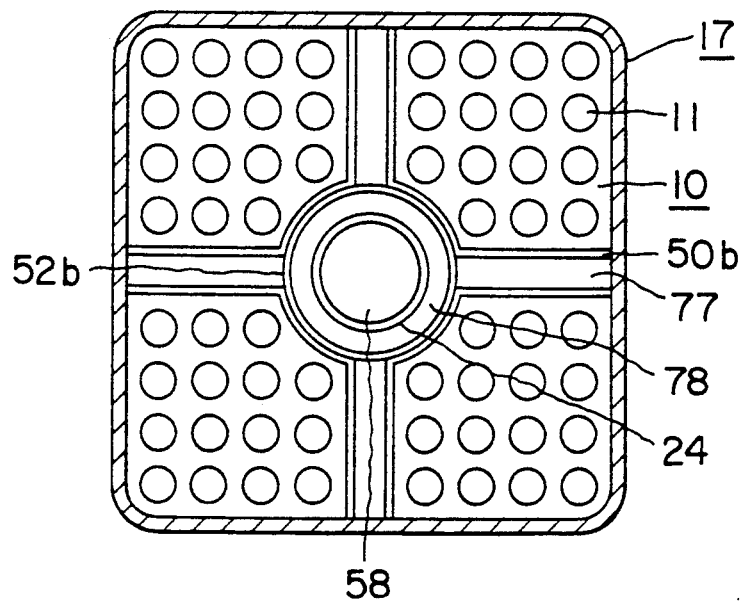
FIG. 11 shows a cross section similar to that of FIG. 2 but representing a third embodiment of the present invention.

Next, FIG. 11 represents a third embodiment according to the present invention, in which a hollow tube 52b is arranged as flow passage sectioning member at an outside of the control element guide tube 24 concentrically therewith and in which the blade portions of the water cross are formed as coolant rising passages 77 and an annular portion is formed as coolant lowering passage 78. In this embodiment, a plurality of support spacers are arranged in a hollow tube 52b along the axial direction of the fuel assembly and support the control element guide tube 42, not shown in FIG. 11, having structure capable of passing the coolant through the annular portion. According to this structure of the fuel assembly, the control element guide tube and the water cross can be made simple, thus being easily manufactured.

In the fuel assembly of FIG. 11, when the water cross has thin thickness, the hollow tube of the central control element guide tube is made too slender and, hence, only small contribution is achieved to the increasing of the control rod worth, a countermeasure is such that the outer diameter of the control element guide tube may be made large by removing the fuel rods adjoining the central portion of the water cross to increase the control rod reactivity. As described above, such improved structure may be utilized in combination with the water cross of the structure shown in FIG. 2 or 10.

Figure 12:
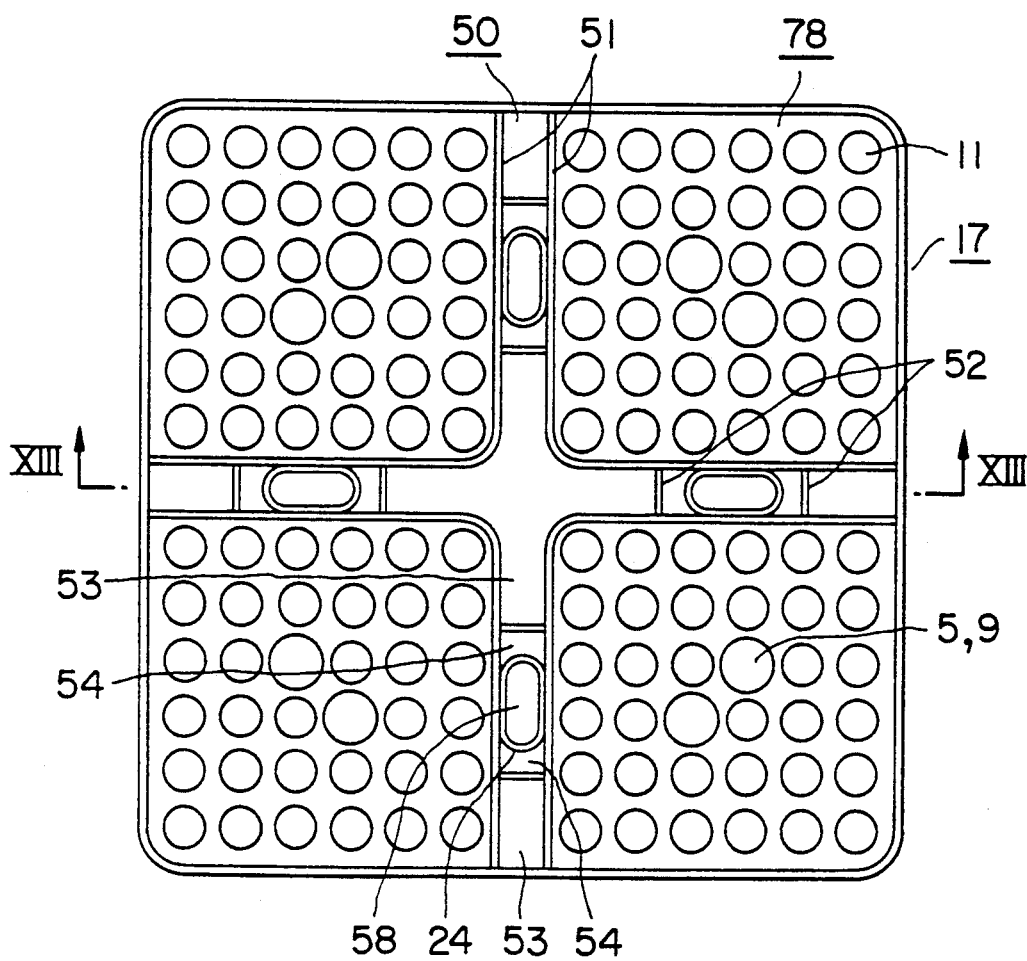
FIG. 12 shows a cross section similar to that of FIG. 2 but representing a fourth embodiment of the present invention.
Figure 13:
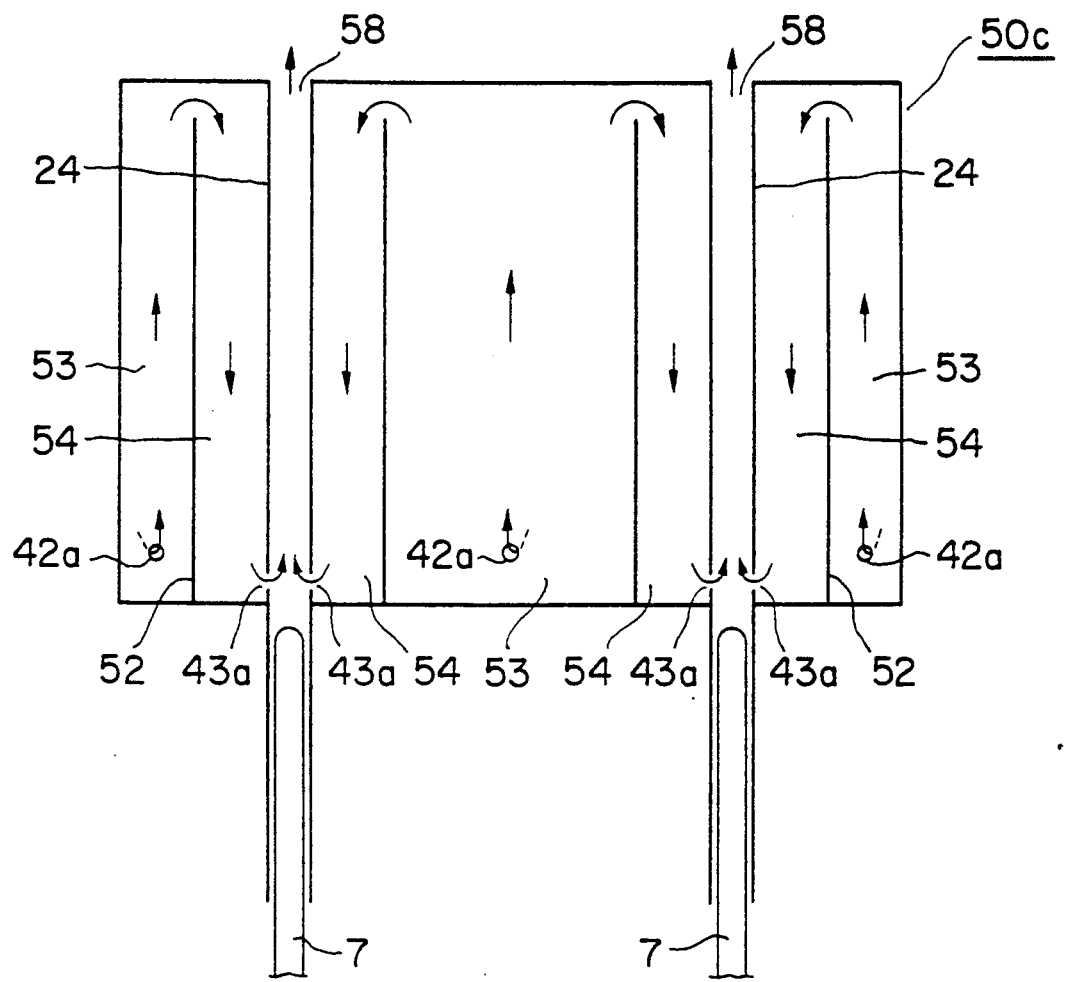
FIG. 13 is an illustrated view taken along the line XIII—XIII in FIG. 12.
Figure 21:
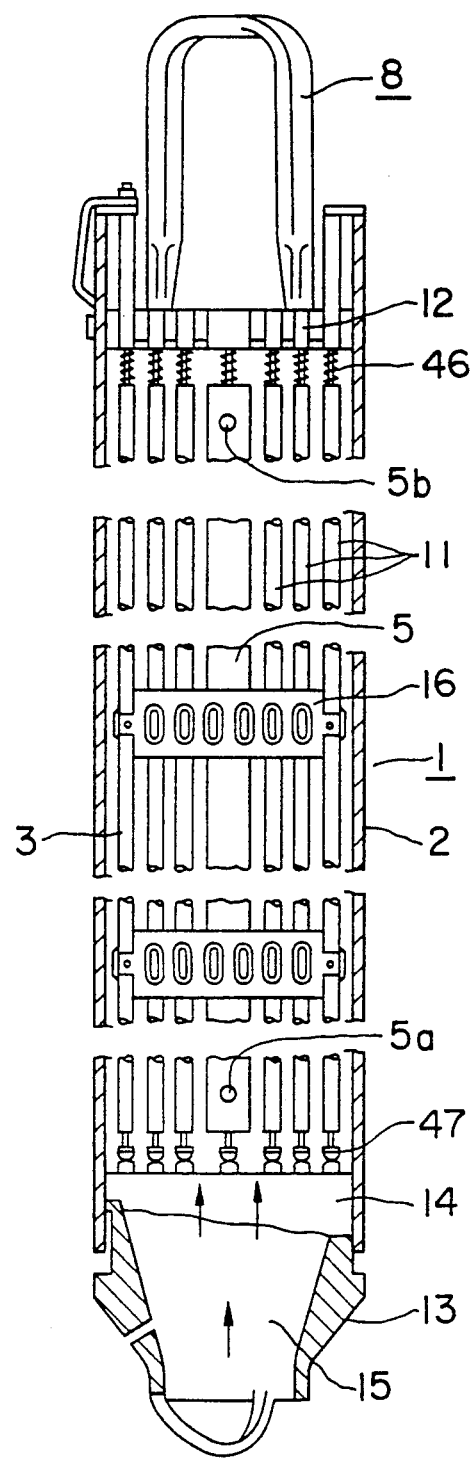
FIG. 21 is an elevational section of a fuel assembly of a conventional structure provided with a water rod.
Figure 22:
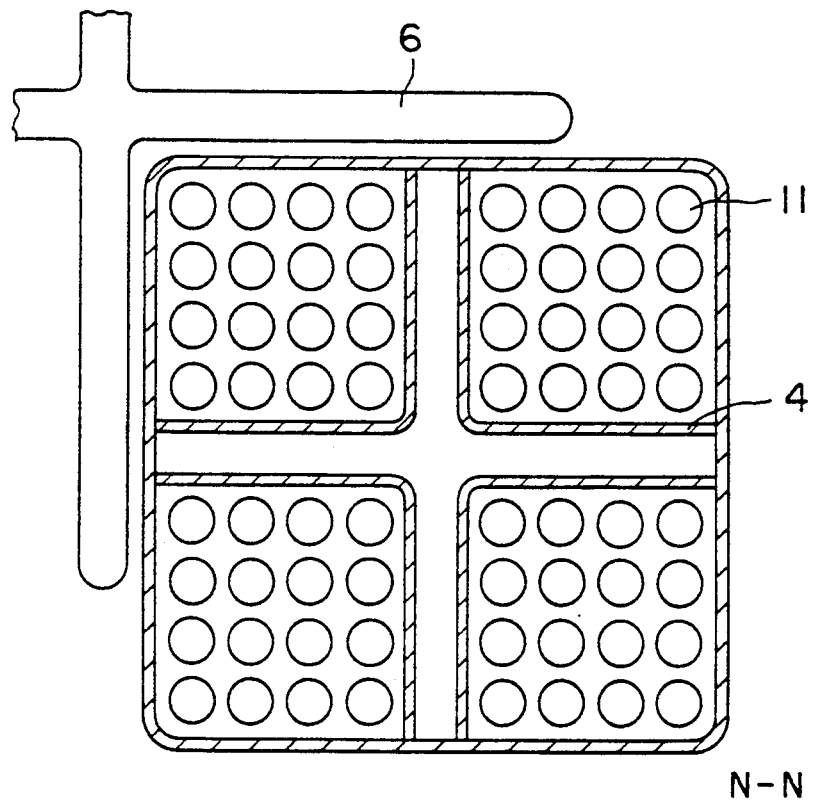
FIG. 22 is a cross sectional view of a fuel assembly of a conventional structure provided with a water cross.

FIGS. 12 and 13 further represent a fourth embodiment according to the present invention, in which a plurality of control element guide tubes 24 are arranged in the water cross 50. In this structure, the fuel bundle 30 has a lattice structure larger than that, i.e. 4×4 lattice structure, of the embodiment shown in FIG. 2. For example, this structure may be preferably adapted for the large-sized fuel assembly 78 having a water cross constituted by fuel bundles each in 6×6 lattice structure. By increasing the number of the control element guide tubes in this manner, the control rod reactivity can be increased and the reduction of the reactor shutdown margin in the enlargement of the fuel assembly can be improved. Furthermore, since the control elements 7 are inserted into the control element guide tubes disposed in the water cross, the number of the fuel rods per one fuel assembly is not reduced and the fuel packing amount in the fuel pellet is not reduced, thus being advantageous in the fuel economy. Furthermore, in such large-sized fuel assembly, since it is intended that the thermal neutron flux at the central portion of the fuel bundle is increased to make flat the power distribution, the water rod 5 of the conventional structure shown in FIG. 21 or the water rod 9 capable of having spectrum shift of the conventional structure shown in FIG. 25 may be utilized in combination.

Figure 5B:
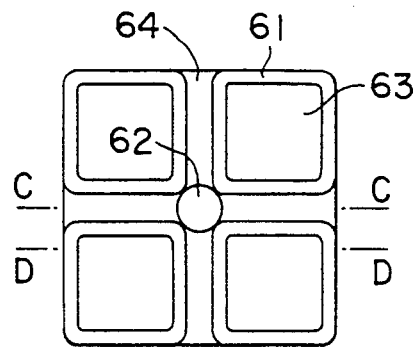
Figure 5C:
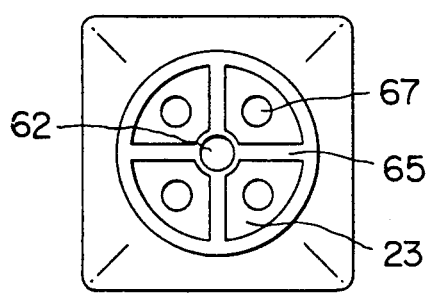
Figure 5D:
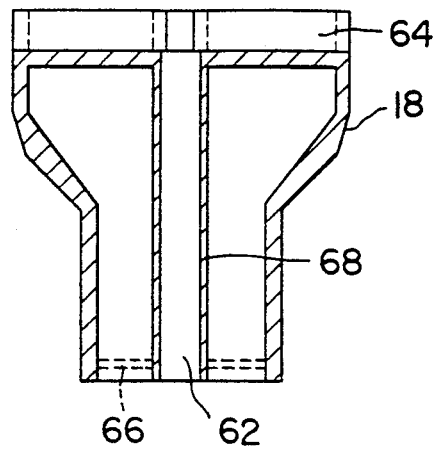
Figure 5E:
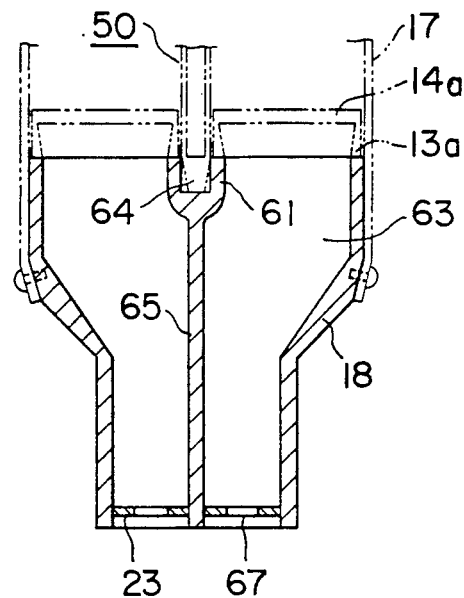
Figure 14:
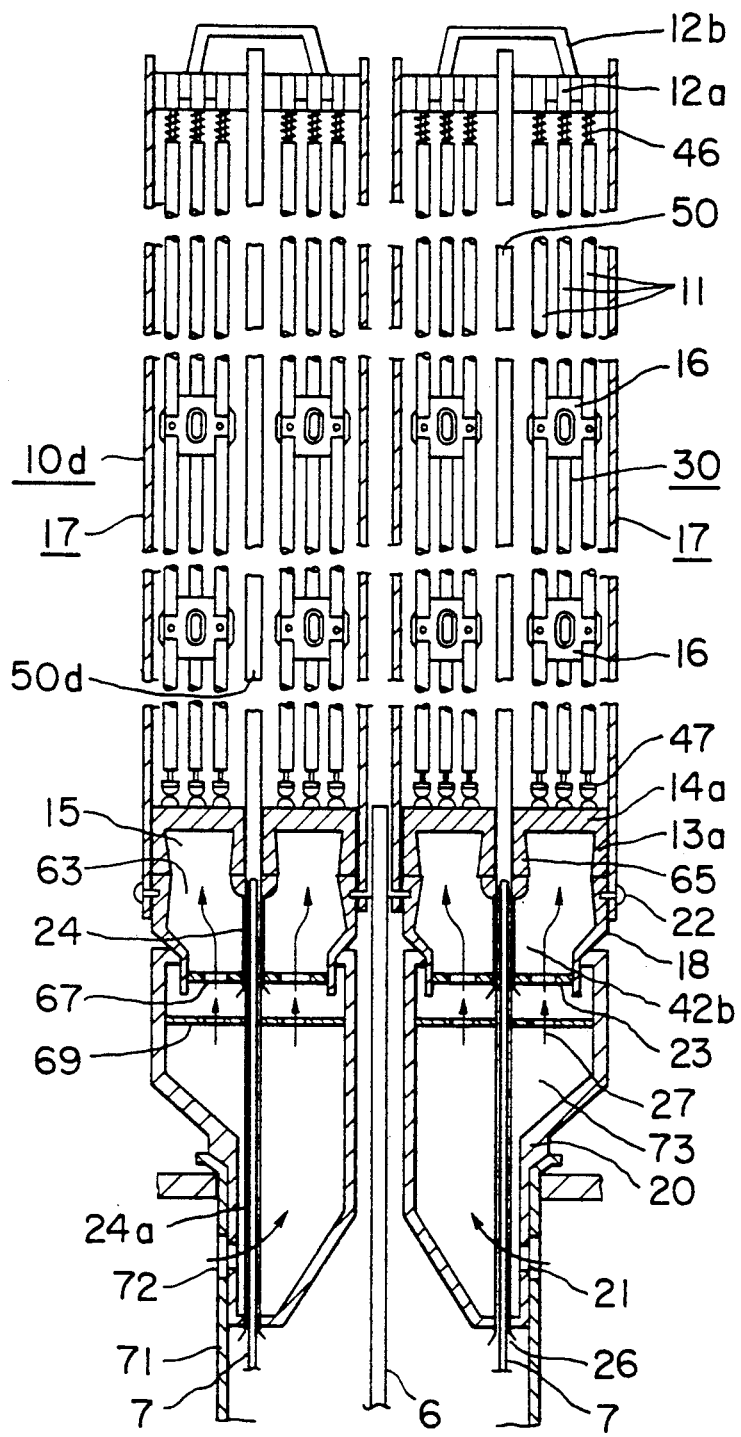
FIG. 14 is an elevational section of a fuel assembly according to a fifth embodiment of the present invention.
Figure 15:
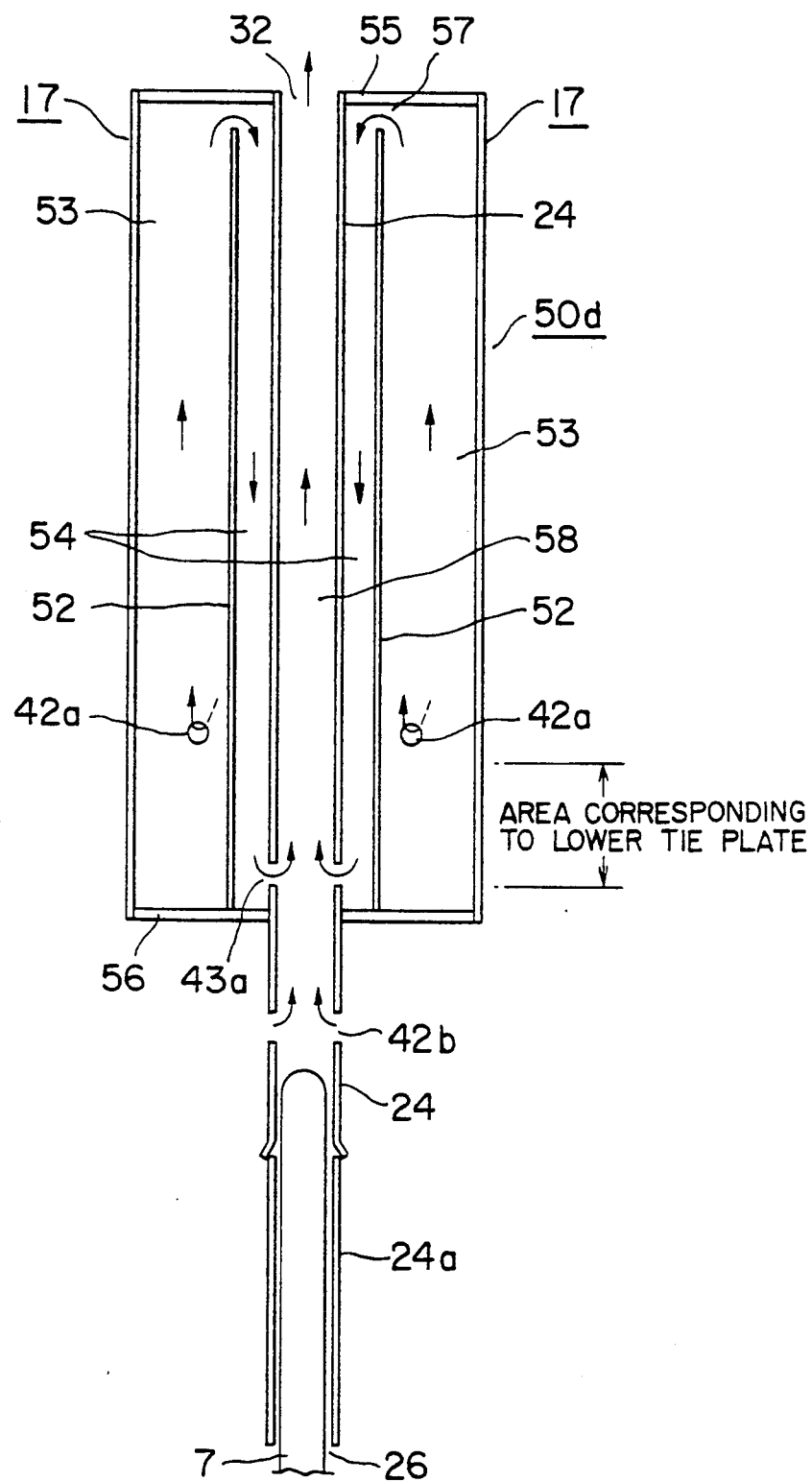
FIG. 15 is an elevational view of a water cross of the fuel assembly of FIG. 14.

FIGS. 14 and 15 represent a fuel assembly of a fifth embodiment as a modification of the first embodiment, in which a further coolant inlet 42b is formed to the lower portion of the control element guide tube 24, and an opening is formed to a corresponding position of the hollow tube 68, shown in FIG. 5B, disposed at the central portion of the flow passage sectioning member 65 of the lower nozzle 18, so that the coolant passing the flow passage 63 can be taken inside the control element guide tube 24 through the inlet opening 42b. In this fifth embodiment, the coolant inlet opening 42b is formed above the orifice 23 acting as the flow passage resisting means in a view point of reducing the pressure difference between the openings 42b and 32 shown in FIG. 15 and preventing the extremely large coolant flow rate.

As shown in FIGS. 14 and 15, in a case where the upper end of the control rod element 7 is positioned below the inlet opening 42b, the coolant through the lower nozzle 18 flows in the control element guide tube through the opening 42b and then flows out through the upper opening 32 in the upper plenum. As this result, non-boiling water flows inside the control element guide tube. This fact increases the amount of the moderator at the end of cycle and the area of the control element guide tube is occupied with the non-boiling water like the case of the water cross when it is required to facilitate the moderation of the neutron, thus increasing the moderating effect.

In a case where the upper end of the control element 7 is positioned above the drain opening 43a, the opening 43a is closed by the control element 7 and the flow resistance at the drain port becomes large, so that the coolant flow amount flown out is reduced, whereby the steam void is caused in the water cross as described hereinbefore due to the heating and the heat transfer by the neutron and γ-rays and the liquid surfaces of the flow passages 53 and 54 are depressed. In thus manner, the liquid levels in the flow passages 53 and 54 are depressed downward until the time when the pressure difference between the inlet port 42a and the drain port 43a has been balanced to the pressure drop and water head in the flow passage in the water cross. As this result, the inside of the water cross is filled up with the steam. Further, a large amount of the steam void is also caused in the control element guide tube because of the reduced coolant flow rate through the openings 42b and 43a.

When the upper end of the control element 7 is moved downward below the coolant inlet port 42b by the downward withdrawal of the control element 7, the coolant flows into the control element guide tube through the coolant inlet 42b and rises upward, and at this time, the steam flow is sucked through the drain port 43a. Accordingly, the flow mode change, i.e. transformation from steam filling state to liquid single phase flow state, in the water cross is accelerated, and the power increasing of the reactor can be speedily changed in comparison with the case of locating no coolant inlet port 42b.

Figure 2:
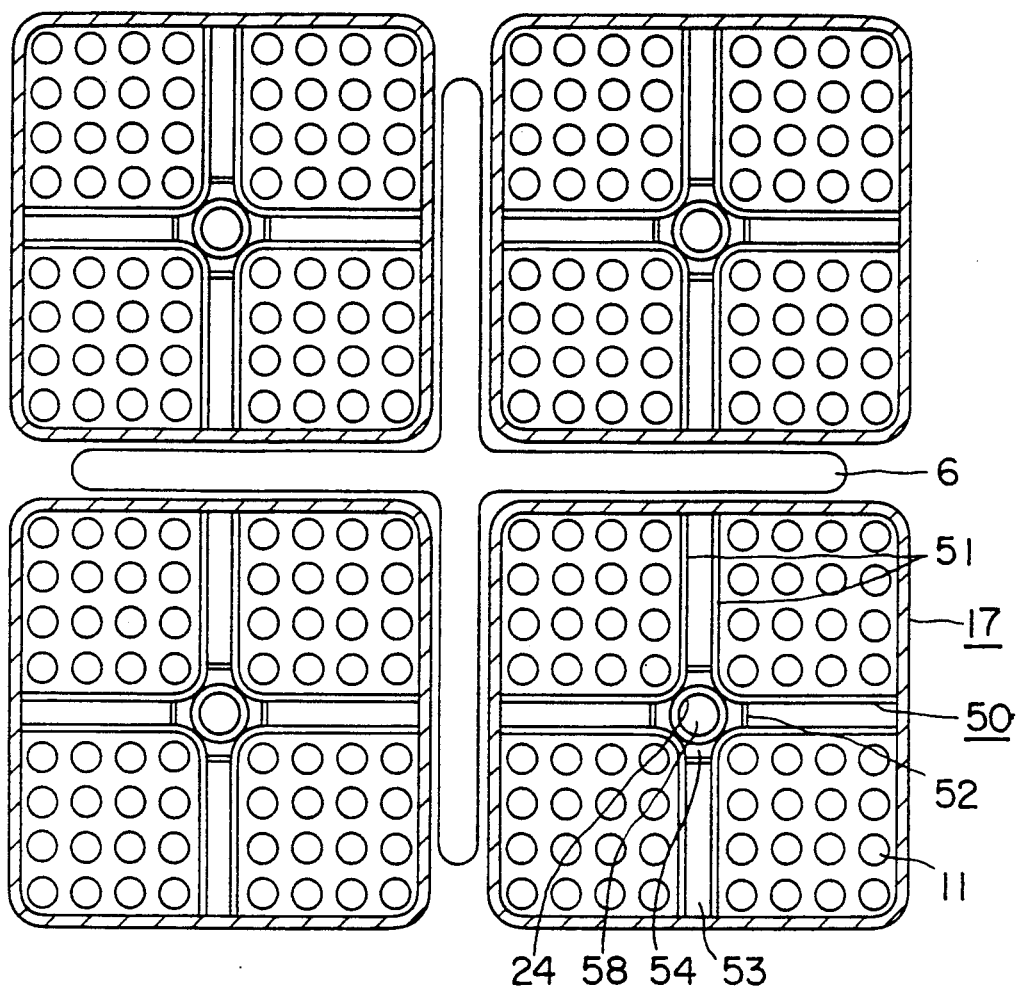
FIG. 2 is a cross sectional view taken along the line II-II in FIG. 1.
Figure 16:
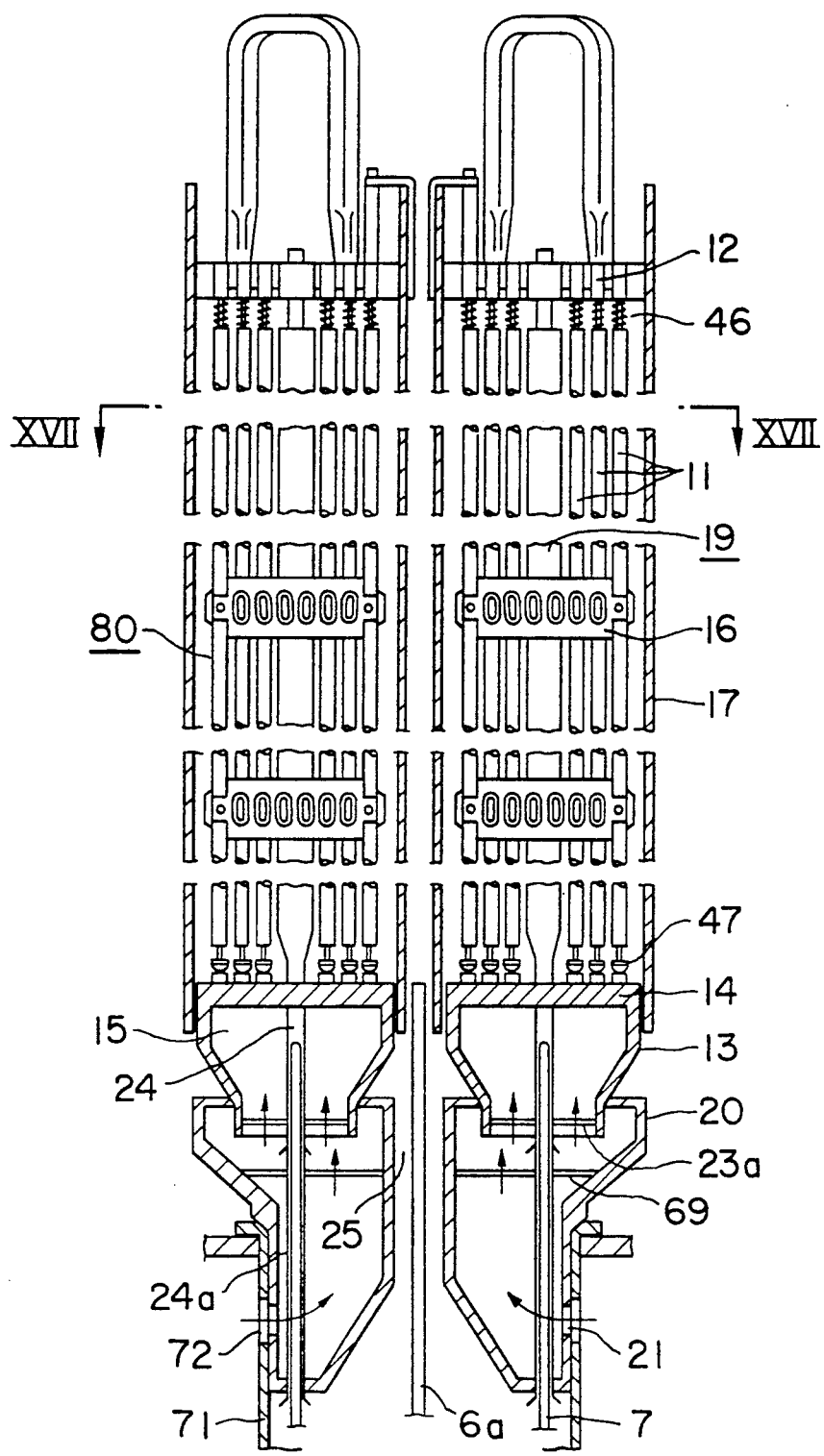
FIG. 16 is a view similar to that of FIG. 14 but showing a sixth embodiment of the present invention.
Figure 17:
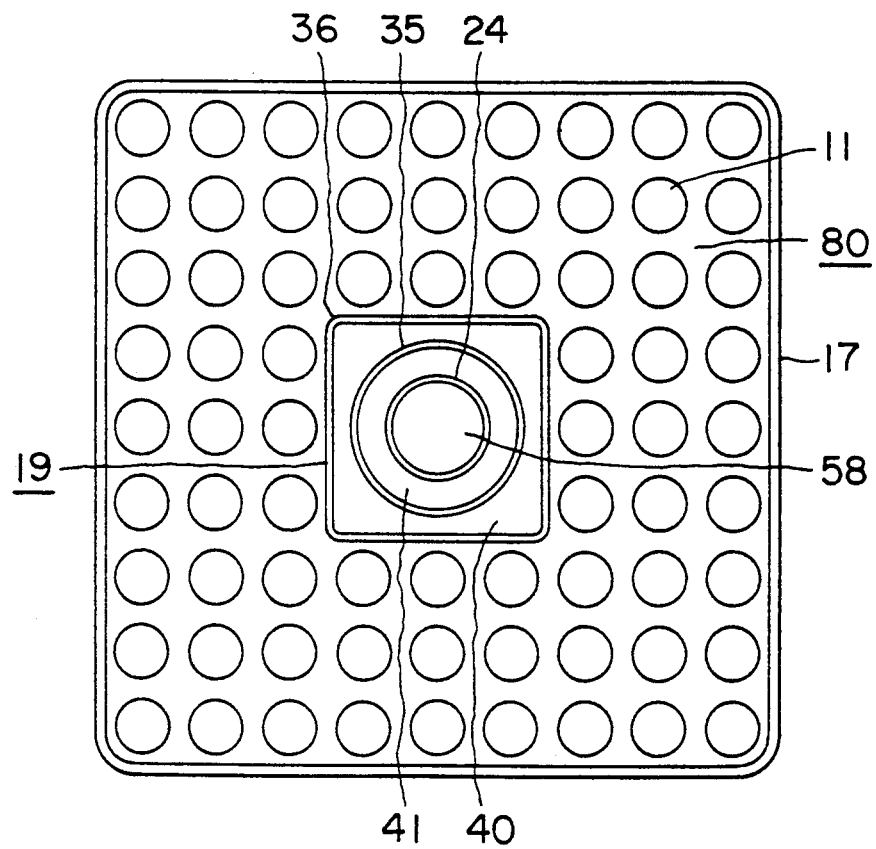
FIG. 17 is a cross sectional view taken along the line XVII—XVII in FIG. 16.
Figure 18:
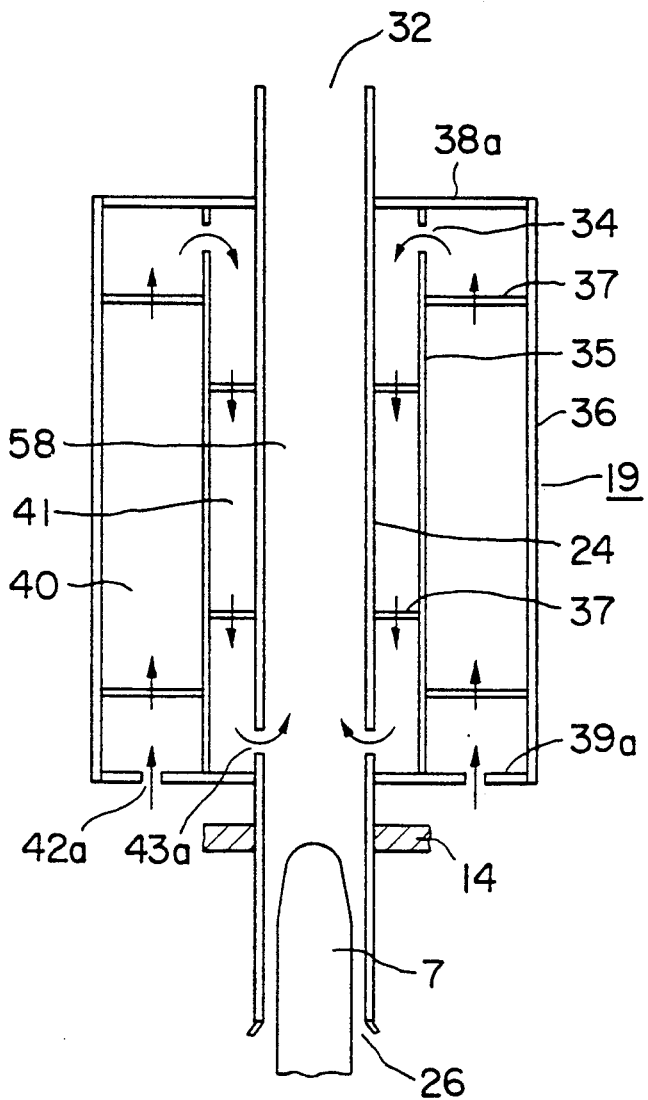
FIG. 18 is an illustrated view of a water rod of the fuel assembly of FIG. 16.

FIGS. 16 to 18 represent a sixth embodiment of the fuel assembly 80 of the present invention, which is different from the embodiment of FIGS. 1 and 2 in which the control element guide tube is incorporated in the water cross. Namely, in the sixth embodiment, the fuel assembly 80 is provided with a water rod 19 in which a control element guide tube is incorporated, and FIG. 16 shows an example in which one polygonal, substantially square in illustrated cross section, water rod 19 is centrally disposed in the fuel assembly 80, but it may be possible to dispose, in alternation, a circular cylindrical water rod or a plurality of water rods. Furthermore, the water rod 5 of the conventional structure or the water rod 9 having the spectrum shift function may be utilized in combination.

The water rod 19 is composed, as shown in FIGS. 17 and 18, of an inner tube 35, an outer tube 36, spacers 37 and a control element guide tube 24. The inner tube 35 and the control element guide tube 24 are supported by the spacers 37, and the upper end openings of the inner tube 35 and the outer tube 36 are closed by an annular end plug 38a. The control element guide tube 24 is connected with a control element guide tube 24a, having an upper portion extending beyond the end plug 38a and inserted into the upper tie plate 12 and supported thereby with an upper end opening 32 being opened above the upper tie plate 12. The inner tube 35 is provided with a conjunction hole 34 positioned below the end plug 38a so as to connect an annular flow passage 41 (coolant lowering passage), between the inner tube 35 and the control element guide tube 24, with an annular coolant rising passage 40, between the outer tube 36 and the inner tube 35. Each of the spacers 37 has an opening for ensuring the spaces for the coolant rising and lowering passages 40 and 41. The lower ends of the inner and outer tubes 35 and 36 are closed by an annular end plug 39a positioned above the fuel rod support member 14, and the end plug 39a is provided with a coolant inlet opening 42a connecting with the annular coolant flow passage 40. The control element guide tube 24 has a drain port 43a positioned above the annular plug 39a and the lower end portion of the guide tube 24 penetrates the fuel rod support member 14 and is supported by a guide tube support plate 23a. The lowermost end of the guide tube 24 is formed as a control element insertion opening 26 opened at the lower end portion of the lower tie plate 13.

The fuel support 20 is fitted to the upper end opening of the control rod guide tube 71 and is provided, at its lower side surface, with coolant inlet ports 21 facing the openings 72 of the control rod guide tube 71 as shown in FIG. 16. The coolant inlet port 21 is formed to each of the four fuel bundles. The control element guide tube 24a is secured to the fuel support fitting 20 by means of a guide tube support plate 69 and the bottom portion of the fuel support 20. The upper end portion of the control element guide tube 24a is engaged with the lower end portion of the control element guide tube 24 of the water rod 19 in this embodiment. To the central portion of the fuel support 20 is formed a cross shaped opening into which the cross shaped control blades are guided and inserted so that the control blades are positioned at the central portion of the four fuel assemblies such as shown in FIG. 2.

The coolant is guided, as shown in FIG. 16, to the coolant passage between the fuel rods 11 of the respective fuel rod bundles through the opening 72 formed to the side surface of the control element guide tube 71 and the coolant inlet orifice 21 formed to the side surface of the fuel support 20 and then through the through hole, not shown in FIG. 16, formed to the fuel rod support member 14 of the lower tie plate 13 of the fuel assembly. One part of the coolant flown in the coolant guide inlet 15 of the lower tie plate 13 flows into the bypass flow passage, which is outside the channel flow passage, through the leak hole, not shown in FIG. 16, formed to the lower tie plate 13. As shown in FIG. 18, the coolant flows into the coolant rising passage 40 through the coolant inlet 42a of the water rod 19 and then is drained into the inside 58 of the control element guide tube 24 through the conjunction hole 34, the coolant lowering passage 41 and finally the drain port 43a positioned near the lower end portion of the water rod 19.

In a case where the front (upper) end of the control element 7 is positioned below the drain port 43a, the coolant flown through the drain port 43a is becomes the liquid phase or steam phase in accordance with the flow rate of the coolant flown through the coolant inlet 42a in accordance with the core flow rate (refer to the curve A in FIG. 8).

In a case where the upper end of the control element 7 is positioned above the drain port 43a, the drain port 43a is closed by the control element 7 and the drain port resistance is hence increased. The steam void is caused in the inside of the water rod 19 due to the heating and heat transfer by the neutron and γ-rays, whereby pressure drop is increased at the drain port 43a and in the coolant rising and lowering passages 40 and 41, and the water levels in the passages 40 and 41 are lowered until the time when the pressure difference between the coolant inlet 42a and the drain port 43a is balanced to the pressure drop and the water head in the water rod passage. As this result, the inside of the water rod 19 is filled up with the steam, and furthermore, since the coolant is less supplied into the inside 58 of the control element guide tube 24, the void is caused in the inside 58 of the guide tube 24 and the steam is hence filled up therein (refer to the curve C in FIG. 8).

When the control rod 6a is inserted into the upper portion, the control element 7 is also inserted into the upper portion of the central control element guide tube of the water rod 19. In this case, since the upper end of the inside passage 58 is opened, the inner pressure does not increase and the coolant is then discharged through this upper end opening. As this result, the control rod is smoothly inserted without jumping the fuel assembly at the control rod insertion time.

On the contrary, when the control rod is drawn downwardly outward, the inner pressure in the control element guide tube 24 is reduced. However, the steam occupies the inside of the control element guide tube during the power operation state and is expanded therein, so that the degree of this pressure reduction is small. At the reactor shut-down state, the non-boiling water occupies its inside to thereby make small the flow resistance and counterflows through the upper end opening, thus smoothly drawing downward the control rod.

Accordingly, the void fraction can be surely controlled by the control elements 7, as described with respect to the first embodiment, in the fuel assembly provided with the water rod 19.

Furthermore, according to the structure in which the opening is formed to the lower portion of the control element guide tube 24 at a portion below the fuel rod support member 14 to thereby guide the coolant into the inside of the control element guide tube 24, substantially the same functions as those attained by the fourth embodiment of FIGS. 14 and 15 can be attained as well as the controlling of the axial position of the upper end of the control element 7.

It may be better to secure the water rod 19 integrated with the control element guide tube 24 to the lower tie plate 13 to prevent the water rod from vertically shifting at the control rod insertion or withdrawal time. In FIG. 17 there is the water rod in one fuel assembly, but a plurality of water rods design case is considered also.

Figure 19:
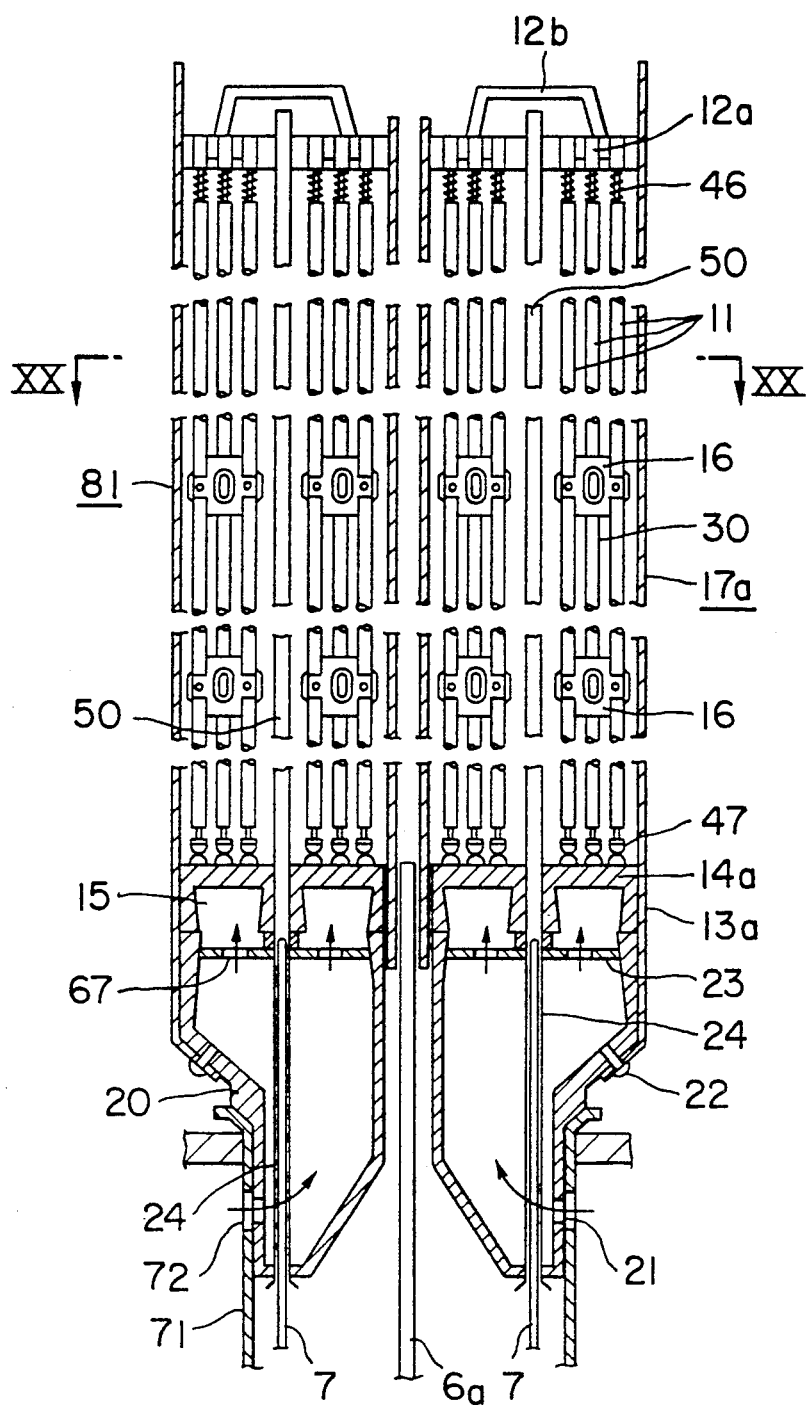
FIG. 19 is an elevational section of a fuel assembly unit representing a seventh embodiment of the present invention.
Figure 20:
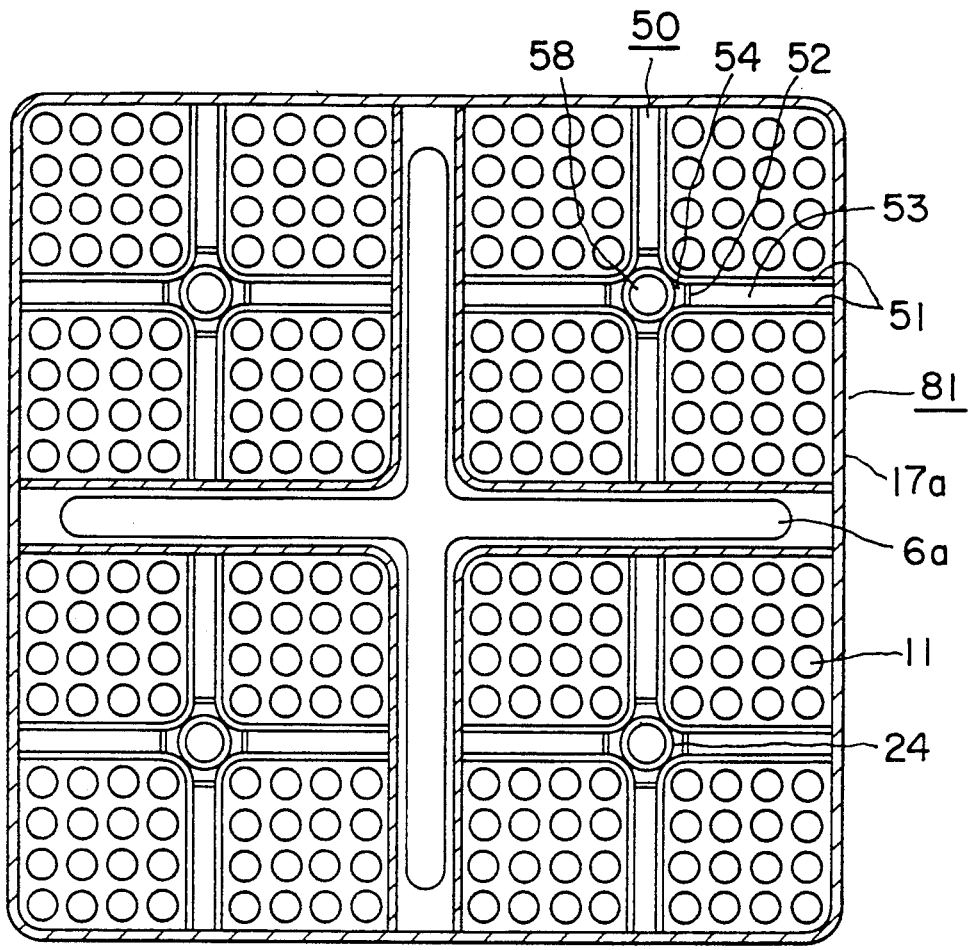
FIG. 20 is a cross sectional view taken along the line XX—XX in FIG. 19.

FIGS. 19 and 20 represent a seventh embodiment as a modification of the first embodiment, in which four fuel assemblies 10 are combined to form a large fuel assembly unit 81. In such fuel assembly unit 81, the lower nozzles of the fuel assemblies 10 and the fuel support are integrated and a channel box 17a is directly fastened to the fuel support by means of screws. According to the provision of such large-sized fuel assembly unit, the four fuel assemblies surrounding the control rod are integrated, so that the control elements 7 and their guide tube 24 can be stably mounted at their combined portions, thus being advantageous. It is to be understood that four fuel assemblies of the other embodiments can be combined into a fuel assembly unit in the like manner to thereby achieve substantially the same advantages.

In a case where an abnormal transition phenomenon or accident be caused during the reactor power operating state, the control rod should be rapidly inserted to rapidly change the reactor to a subcritical state or low power operating state to thereby protect the nuclear reactor or power plant. In such case, it is better for a scram control rod, i.e. rapidly inserting control rod, to have a weight as light as possible and insertion resistance as small as possible. In this meaning, it is better for the scram control rod to have a conventional cross shape (such as structure shown in FIG. 6 but not provided with the control element 7). In such case, there causes a coolant flow directing from the coolant inlets 42a and 42b, towards the control element insertion inlet or towards the upper end opening 32 of the control element guide tube, and the coolant flow rate cooling the fuel rods 11 is reduced, so that it is better to insert, from the lower portion of the guide tube 24, and then attach thereto an inserting member, as a flow rate limiter, having a shape corresponding to a upper end of the control element at a portion below the opening 43a so as to close the opening 42b. In such case, the spectrum shift function can be also realized by the control of the core flow rate. Furthermore, this can be realized by the number of the scram control rods less than one fourth of the number of the total control rods in the core, so that the effects attained by the spectral shift operation is less lowered.

In the foregoing embodiments, the cross shaped control rod has a $B_4C$ poison tube, but it may be possible to provide a control rod formed by Hf rods or Hf plates in shape of cross form to attain substantially the same effects. Furthermore, the water rod of the structure shown in FIG. 18 integrated with the control element guide tube may be utilized in a fuel assembly used in combination of a cluster type control rod also to attain substantially the same effects described above.

What is claimed is:

1. A fuel assembly comprising, in a vertically installed state:
   an outer cylindrical channel box;
   an upper tie plate;
   a lower tie plate;
   a number of fuel rods disposed inside the channel box so as to form coolant flow passage between mutually adjacent fuel rods and having upper and lower end portions supported by the upper and lower tie plates, respectively, each of said fuel rods being packed with a fuel pellet;
   a water cross arranged between the fuel rods, an inside of said water cross being divided into a coolant rising passage and a coolant lowering passage; and
   a control element guide tube member disposed inside the water cross and extending along an entire axial direction of the water cross, said coolant rising passage having a coolant inlet port formed to a portion above or under a portion at which the fuel rods are supported by the lower tie plate, said control element guide tube member having a coolant outlet port formed at a portion near a portion at which the fuel rods are supported by the lower tie plate so that a coolant introduced into the coolant rising passage flows vertically upwardly, then turns downwardly at a portion near an upper end of the water cross and then flows downwardly in the coolant lowering passage along the outer surface of the control element guide tube member in a direction reverse to the coolant flow in the coolant arising passage, and flows into an inside of the control element guide tube thereof through the coolant outlet port, said control element guide tube member having an upper opening opened outward at an upper end portion of the water cross and a lower end opening through which a control element is inserted into the control element guide tube member,
   wherein said coolant outlet port formed to the control element guide tube member is positioned in a vertical alignment between a lower end portion of an effective fuel region defined to the fuel rod and the lower opening end of the control element guide tube member.

2. A fuel assembly according to claim 1, wherein said channel box has substantially a square cross section and said water cross is disposed in the channel box with a crossing central portion arranged at substantially a central portion of the channel box.

3. A fuel assembly according to claim 1, wherein said water cross is provided with blade portions crossing at its central portion, said control element guide tube member is disposed at the crossing portion of the blade portions, upper and lower end portions of said water cross are closed by plugging members and the inside of the water cross is divided into the coolant rising and lowering passages by a sectioning structure formed axially along the control element guide tube member, said sectioning structure having a lower end attached to the lower plugging member and an upper end slightly apart from the upper plugging member.

4. A fuel assembly according to claim 3, wherein said control element guide tube member has an upper end opened at the upper plugging member and a lower end downwardly penetrating the lower plugging member.

5. A fuel assembly according to claim 3, wherein said sectioning structure comprises a sectioning member disposed axially along the control element guide tube member.

6. A fuel assembly according to claim 3, wherein said sectioning structure is formed by narrowing an intermediate portion of each of the blade portions.

7. A fuel assembly according to claim 3, wherein said control element guide tube member is a hollow cylindrical tube and said sectioning structure comprises a hollow cylindrical tube concentrically disposed outside the control element guide tube member with an annular space therebetween.

8. A fuel assembly according to claim 7, wherein the coolant rising passage is formed in each of the blade portions of the water cross and the coolant lowering passage is formed in the annular space.

9. A fuel assembly according to claim 3, wherein said water cross is provided with blade portions crossing at its central portion, said control element guide tube member is disposed in an intermediate portion of each of the blade portions, upper and lower end portions of said water cross are closed by plugging members and the inside of the water cross is divided into the coolant rising and lowering passages by a sectioning structure formed axially along the control element guide tube member, said sectioning structure having a lower end attached to the lower plugging member and an upper end slightly apart from the upper plugging member.

10. A fuel assembly according to claim 9, wherein said sectioning structure comprises a sectioning member disposed horizontally inside and outside the control element guide tube member disposed in each of the blade portions of the water cross.

11. A fuel assembly according to claim 3, wherein a further coolant inlet port is formed to the control element guide tube member at a portion below the lower plugging member.

12. A fuel assembly comprising, in a vertically installed state:
an outer cylindrical channel box;
an upper tie plate;
a lower tie plate;
a number of fuel rods disposed inside the channel box so as to form coolant flow passage between mutually adjacent fuel rods and having upper and lower end portions supported by the upper and lower tie plates, respectively, each of said fuel rods being packed with a fuel pellet;
a water rod or a plurality of water rods means arranged between the fuel rods, an inside of said water rod being divided into a coolant rising passage and a coolant lowering passage; and
a control element guide tube member disposed inside the water rod and extending along an entire axial direction of the water rod, said coolant rising passage having a coolant inlet port formed to a portion above or under a portion at which the fuel rods are supported by the lower tie plate, said control element guide tube member having a coolant outlet port formed at a portion near a portion at which the fuel rods are supported by the lower tie plate so that a coolant introduced into the coolant rising passage flows vertically upwardly, then turns downwardly at a portion near an upper end of the water rod and then flows downwardly in the coolant lowering passage along the outer surface of the control element guide tube member in a direction reverse to the coolant flow in the coolant rising passage, and flows into an inside of the control element guide tube thereof through the coolant outlet port, said control element guide tube member having an upper opening opened outward at an upper end portion of the water rod and a lower end opening through which a control element is inserted into the control element guide tube member, wherein said coolant outlet port formed to the control element guide tube member is positioned in a vertical alignment between a lower end portion of an effective fuel region defined to the fuel rod and the lower opening end of the control element guide tube member.

13. A fuel assembly according to claim 12, wherein said water rod comprises one polygonal cylindrical tube arranged centrally in the channel box and the control element guide tube member having a circular cross section is disposed inside the polygonal cylindrical tube.

14. A fuel assembly according to claim 13, wherein the polygonal cylindrical tube has substantially a square cross section.

15. A fuel assembly according to claim 12, wherein said water rod comprises an outer tube constituting an outer appearance of the water rod, an inner tube disposed inside the outer tube, the control element guide tube member disposed inside the inner tube and spacer means for supporting the inner tube to the outer tube and supporting the control element guide tube member to the inner tube.

16. A fuel assembly according to claim 12, wherein said upper and lower end portions of said outer and inner tubes are closed by plugging members and the inside of the water rod is divided into the coolant rising and lowering passages by a sectioning structure formed axially along the control element guide tube member and said sectioning structure is composed of the inner tube, wherein the coolant rising passage is formed by a space between the outer tube and an inner tube and the coolant lowering passage is formed by a space between the inner tube and the control element guide tube member, said inner tube being provided with a conjunction hole at a portion below the upper plugging member so as to connect the coolant rising passage with the coolant lowering passage, said spacer means being provided with opening ports through which the coolant passes.

17. A fuel assembly according to claim 16, wherein said control element guide tube member has an upper end opened above the upper plugging member and a lower end downwardly penetrating the lower plugging member and the lower end of the control element guide tube member has an opening through which the control element is inserted thereinto.

18. A fuel assembly unit comprises a plurality of the fuel assemblies of the structure defined in claim 1.

19. A fuel assembly unit according to claim 18, comprises four fuel assemblies divided by a cross shaped control rod means disposed between four fuel assemblies.

20. A reactor core comprising:
a plurality of fuel assemblies each comprising, in a vertically installed state:
an outer cylindrical channel box;
an upper tie plate;
a lower tie plate;
a number of fuel rods disposed inside the channel box so as to form coolant flow passage between mutually adjacent fuel rods and having upper and lower end portions supported by the upper and lower tie plates, respectively, each of said fuel rods being packed with a fuel pellet;
a water rod or a plurality of water rods means arranged between the fuel rods, an inside of said water rod means being divided into a coolant rising passage and a coolant lowering passage;
a control element guide tube member disposed inside the water rod means and extending along an entire axial direction of the water rod means, said coolant rising passage having a coolant inlet port formed to a portion above or under a portion at which the fuel rods are supported by the lower tie plate, said control element guide tube member having a coolant outlet port formed at a portion near a portion at which the fuel rods are supported by the lower tie plate so that a coolant introduced into the coolant rising passage flows vertically upwardly, then turns downwardly at a portion near an upper end of the water rod and then flows downwardly in the coolant lowering passage along the outer surface of the control element guide tube member in a direction reverse to the coolant flow in the coolant rising passage, and flows into an inside of the control element guide tube thereof through the coolant outlet port, said control element guide tube member having an upper opening opened outward at an upper end portion of the water cross and a lower end opening through which a control element is inserted into the control element guide sheath member;
a control rod having a cross shaped section to be inserted between the fuel assemblies; and
a plurality of control elements to be used in combination with the control rod and inserted into the control element guide tube member,
wherein a void fraction in the water rod means is controlled by controlling an axial position of the control rod inserted into the reactor core.

21. A reactor core according to claim 20, wherein said water rod means comprises a water cross having a cross shaped blade portions.

22. A reactor core according to claim 20, wherein said water rod means comprises a cylindrical water rod disposed substantially a central portion of the fuel assembly.

23. A reactor core according to claim 20, wherein said control rod means comprises rod cluster type control rod, which is inserted upwardly into the reactor core.

* * * * *